United States Patent [19]
Shibayama

[11] Patent Number: 5,517,357
[45] Date of Patent: May 14, 1996

[54] ANTI-VIBRATION OPTICAL DEVICE

[75] Inventor: Atsushi Shibayama, Kawasaki, Japan

[73] Assignee: Nikon Corporation, Tokyo, Japan

[21] Appl. No.: 217,879

[22] Filed: Mar. 25, 1994

[30] Foreign Application Priority Data

Mar. 30, 1993 [JP] Japan ........................ 5-70633

[51] Int. Cl.⁶ .................. G02B 27/64; G01C 3/12
[52] U.S. Cl. .............. 359/547; 359/554; 356/16
[58] Field of Search ...................... 359/554, 556, 359/557, 553, 555; 250/201.1, 201.3; 356/16

[56] References Cited

U.S. PATENT DOCUMENTS

| | | | |
|---|---|---|---|
| 5,192,964 | 3/1993 | Shinohara et al. | 354/202 |
| 5,235,375 | 8/1993 | Yamana et al. | 250/201.1 |
| 5,270,857 | 12/1993 | Oizumi et al. | 359/554 |
| 5,315,435 | 5/1994 | Horiuchi | 359/554 |
| 5,331,467 | 7/1994 | Sato | 359/557 |

FOREIGN PATENT DOCUMENTS

| | | |
|---|---|---|
| 62-47012 | 2/1987 | Japan . |
| 1-191112 | 8/1989 | Japan . |
| 1-191113 | 8/1989 | Japan . |
| 2-296230 | 12/1990 | Japan . |
| 4-20941 | 1/1992 | Japan . |
| 4-163534 | 6/1992 | Japan . |

*Primary Examiner*—Paul M. Dzierzynski
*Assistant Examiner*—Audrey Chang

[57] ABSTRACT

An optical device having an objective lens system including at least two lens groups (at least one of which is shiftable in the optical axis direction), a vibration detector for detecting a vibration of the objective lens system, and outputting a signal indicating the vibration of the objective lens system, a vibration compensation unit arranged at a position other than the position of the most-object side lens group of the objective lens system, and at least one shift amount detector for detecting the shift amount, in the optical axis direction, of the shiftable lens of the objective lens system, and outputting a signal indicating the shift amount. The drive amount of the vibration compensation unit is calculated based on the signal from the shift amount detector and the signal from the vibration detector.

18 Claims, 12 Drawing Sheets

10

ANTI-VIBRATION OPTICAL DEVICE

BACKGROUND OF THE INVENTION

1. Field of the Invention

The present invention relates to an apparatus for preventing a vibration of an image of an optical system caused by a vibration and, more particularly, to an anti-vibration optical device suitable for a camera, a video camera, a telescope, and the like.

2. Related Background Art

In recent years, as disclosed in U.S. Pat. No. 5,270,857, in a zoom lens system in which a given lens group in the zoom lens system is shifted in a direction perpendicular to the optical axis to perform an anti-vibration operation, an anti-vibration optical system for, when a vibration occurs, controlling the compensation amount for compensating for the vibration in accordance with a zooming state of the zoom lens system is proposed.

However, when the lens group (to be referred to as an anti-vibration lens group hereinafter) to be shifted in an anti-vibration operation for compensating for a vibration is not arranged at the most object side, an ideal shift amount of the anti-vibration lens group for an identical vibration angle varies between an infinity focusing state and a near-distance focusing state. For this reason, when an anti-vibration operation in the near-distance focusing state is performed by a vibration compensation amount proposed in U.S. Pat. No. 5,270,857, a sufficient anti-vibration effect cannot often be obtained.

SUMMARY OF THE INVENTION

It is an object of the present invention to provide an anti-vibration optical device which can realize an optimal vibration compensation state in accordance with a change in state of an objective lens system due to a zooming operation, a focusing operation, and the like.

An anti-vibration optical device according to the present invention comprises an objective lens system having at least two lens groups, a vibration detection unit for detecting a vibration, a vibration compensation means arranged at a position other than that of the most-object side lens group of the objective lens system, at least a portion of the objective lens system being shifted in the optical axis direction of the objective lens system, at least one shift amount detection unit for detecting a shift amount of the shiftable lens group of the objective lens system, and a calculation unit for calculating a drive amount of the vibration compensation unit on the basis of a signal from the shift amount detection unit and a signal from the vibration detection unit.

The vibration compensation unit drives a lens group other than the most-object side lens group of the objective lens system to decenter it in a direction almost perpendicular to the optical axis of the objective lens system. Furthermore, the anti-vibration optical device of the present invention comprises a focusing unit for performing a focusing operation. The focusing unit performs a focusing operation by shifting at least a portion of the objective lens group in the optical axis direction of the objective lens system.

Also, an anti-vibration optical device of the present invention comprises an objective lens system having at least two lens groups, a vibration detection unit for detecting a vibration, a vibration compensation unit arranged at a position other than that of the most-object side lens group of the objective lens system, a focusing unit for performing a focusing operation by shifting at least a portion of the objective lens system in the optical axis direction of the objective lens system, a focal length changing unit for changing a focal length, at least one shift amount detection unit for detecting a shift amount of a shiftable lens group of the objective lens group, and a calculation unit for calculating a drive amount of the vibration compensation unit on the basis of a signal from the shift amount detection unit and a signal from the vibration detection unit.

The focal length changing unit changes the focal length by shifting at least a portion of the objective lens system in the optical axis direction of the objective lens system.

According to the present invention, in the objective lens system comprising k ($2 \leq k$) lens groups, an anti-vibration lens group Gj as the j-th ($2 \leq j \leq k$) lens group in turn from the object side is shifted in the direction perpendicular to the optical axis, thereby compensating for a vibration. At this time, if a refractive index n of a medium before and after each lens group is assumed to be n=1, a primary principal point H and a secondary principal point H' of each lens group respectively coincide with a primary nodal point N and a secondary nodal point N'. Assume that the primary and secondary nodal points N and N' of each lens group respectively coincide with the primary and secondary principal points H and H', and the following description will be made using the primary and secondary principal points H and H'.

As shown in FIG. 1, in a state wherein the objective lens system is constituted by arbitrary k lens groups, the interval between a secondary principal point $H_i'$ of the i-th lens group $G_i$ (i=1, 2, 3, ...) in turn from the object side and a primary principal point $H_{i+1}$ of the (i+1)-th lens group $G_{i+1}$ is represented by $e_i$, the interval between a secondary principal point $H_k'$ of the k-th lens group $G_k$ and an image plane M is represented by $e_k$, and the refracting power of the i-th lens group $G_i$ is represented by $\phi_i$.

When a paraxial on-axis ray R is incident on the above-mentioned objective lens system, and reaches the center of the image plane M, if the entire objective lens system is inclined by an angle $\epsilon$ in a plane including the optical axis to have a primary principal point $H_1$ of the first lens group $G_1$ as the center of rotation, a deviation amount z of a point where the ray R reaches the image plane M from the center of the image plane is given by equation (1) below.

In equation (1), if the principal point intervals of the lens groups are represented by $e_1, e_2, \ldots, e_k$, and the refracting powers of the second and subsequent lens groups are represented by $\phi_2, \ldots, \phi_k$, the deviation amount z is expressed by a product of a function F1 of the principal point intervals of the lens groups and the refracting powers of the second and subsequent lens groups, and the inclination angle $\epsilon$.

$$z = F1(e_1, e_2, \ldots, e_k, \phi_2, \ldots, \phi_k) \cdot \epsilon \quad (1)$$

On the other hand, the j-th lens group from the object side is determined to be an anti-vibration lens group $G_j$, and when the paraxial on-axis ray R is incident on the object lens system, and reaches the center of the image plane M, if the anti-vibration lens group $G_j$ is decentered by x in the direction perpendicular to the optical axis, a deviation amount y of a point where the ray R reaches the image plane M from the center of the image plane is given by equation (2) below.

In equation (2), if the principal point intervals of the anti-vibration lens group $G_j$ and subsequent lens groups are represented by $e_j, \ldots, e_k$, and the refracting powers of the anti-vibration lens group $G_j$ and subsequent lens groups are represented by $\phi_j, \ldots, \phi_k$, the deviation amount y is expressed by a product of a function F2 of the principal point intervals of the j-th and subsequent lens groups and the refracting powers of the j-th and subsequent lens groups, and the decentering amount x of the anti-vibration lens group.

$$y = F2(ej, \ldots, ek, \phi j, \ldots, \phi k) \cdot x \quad (2)$$

When the objective lens system is inclined at the angle $\epsilon$, in order to perform an anti-vibration operation by decentering the anti-vibration lens group by the decentering amount x, the decentering amount x of the anti-vibration lens group is set, so that the deviation amounts z and y satisfy $z+y=0$.

At this time, the inclination angle $\epsilon$ and the decentering amount x have the relationship given by equation (3) below therebetween:

$$x = -\epsilon \cdot F1(e1, e2, \ldots, ek, \phi 2, \ldots, \phi k)/F2(ej, \ldots, ek, \phi j, \ldots, \phi k) \quad (3)$$

In this case, if $$F3(e1, e2, \ldots, ek, \phi 2, \ldots, \phi k) =$$

$$-F1(e1, e2, \ldots, ek, \phi 2, \ldots, \phi k)/F2(ej, \ldots, ek, \phi j, \ldots, \phi k)$$

then, equation (3) above can be rewritten as equation (4) below:

$$x = F3(e1, e2, \ldots, ek, \phi 2, \ldots, \phi k) \cdot \epsilon \quad (4)$$

$F3(e1, e2, \ldots, ek, \phi 2, \ldots, \phi k)$ above will be referred to as a vibration compensation coefficient hereinafter. Also, a state wherein the distance from the object point of the objective lens system to the image plane is infinity, or the objective lens system is at the wide-angle end will be referred to as a reference state hereinafter.

When the objective lens system is in the reference state, the vibration compensation coefficient $F3(e1, e2, \ldots, ek, \phi 2, \ldots, \phi k)$ is changed to a vibration compensation coefficient $F3(e01, e02, \ldots, e0k, \phi 2, \ldots, \phi k)$ where $e01, e02, \ldots, e0k$ are the principal point intervals of the lens groups in the reference state.

When the shift amounts of the lens groups from the image plane upon shifting of at least some lens groups of the objective lens system for the purpose of a zooming or focusing operation are represented by $\delta 1, \delta 2, \ldots, \delta k$ under the assumption that the shift in the object direction is defined to be a positive shift, the principal point intervals $e1, e2, \ldots, ek$ of the lens groups are expressed as follows, as shown in FIG. 2:

$$e1 = e01 + \delta 1 - \delta 2$$
$$e2 = e02 + \delta 2 - \delta 3$$
$$\vdots$$
$$ei = e0i + \delta i - \delta i + 1$$
$$\vdots$$
$$ek = e0k + \delta k$$

Since the principal point intervals $e01, e02, \ldots, e0k$ of the lens groups in the reference state, and the refracting powers $\phi 2, \ldots, \phi k$ of the lens groups are constants, the vibration compensation coefficient can be calculated by detecting the shift amounts $\delta 1, \delta 2, \ldots, \delta k$. Furthermore, the vibration compensation amount x of the anti-vibration lens group can be calculated by detecting a vibration of the objective lens system.

This principle will be explained below with reference to FIG. 3. An outer frame 1 in FIG. 3 represents the outer shape of a camera, and the same applies to FIGS. 4 to 9. In FIG. 3, as the lens groups of the objective lens system, only the i-th lens group from the object side, and the anti-vibration lens group are illustrated for the sake of simplicity.

A shift amount detection unit 105 in FIG. 3 detects the shift amounts $\delta 1, \delta 2, \ldots, \delta k$ of lens groups from the reference state of the objective lens system comprising of the lens groups G1, G2, ..., Gk including an i-th lens group 101 in the optical axis direction, and the shift amount $\delta i$ of the i-th lens group 101, and supplies the detection signals to a calculation unit 106.

On the other hand, a vibration detection unit 103 detects the inclination angle $\epsilon$ of the entire objective lens system, and supplies the detection signal to the calculation unit 106.

The calculation unit 106 calculates the drive amount x of an anti-vibration lens group 102 using the function of equation (4) above on the basis of the two different kinds of signals from the shift amount detection unit 105 and the vibration detection unit 103. Based on the drive amount x calculated by the calculation unit 106, a vibration compensation unit 104 is driven to decenter the anti-vibration lens group 102 in the direction perpendicular to the optical axis, thereby compensating for a vibration.

The vibration detection unit 103 may comprise, e.g., (i) a posture sensor utilizing gravity, (ii) a posture sensor utilizing a gyro scope, (iii) an accelerometer, (iv) an angular accelerometer, or the like.

An actuator for the vibration compensation unit 104 may comprise, e.g., (i) a DC motor, (ii) an AC motor, (iii) a stepping motor, (iv) a piezo element, or the like.

The calculation unit 106 may comprise, e.g., (i) a CPU, (ii) an electronic circuit constituted by a CPU and a memory such as a ROM or a RAM, or the like. Note that the calculation unit 106 may also serve as a circuit for controlling the entire apparatus.

The shift amount detection unit 105 may comprise, e.g., (i) means whose electrical resistance changes in correspondence with a change in position, (ii) means which generates an electrical pulse in correspondence with a change in position, (iii) means which generates an optical pulse in correspondence with a change in position, and converts the optical pulse into an electrical signal, (iv) means whose signal value expressed in binary notation changes in correspondence with a change in position, or the like.

Therefore, the shift amount detection unit 105 can detect a shift of the lens group caused by a focusing operation of the objective lens system, a change in focal length, a variable soft focus, a change in image plane characteristics, and the like.

When the objective lens system comprises a variable focal-length lens, a focal length detection unit 115 is arranged in place of the shift amount detection unit 105, as shown in FIG. 4, and the calculation unit 106 calculates the shift amounts of the lens groups on the basis of a focal length signal from the focal length detection unit 115. The calculation means 106 calculates the drive amount x of the anti-vibration lens group 102 on the basis of these calculated shift amounts and the signal from the vibration detection unit 103. The vibration compensation unit 104 is driven on the basis of the drive amount x to decenter the anti-vibration lens group 102 in the direction perpendicular to the optical axis, thereby compensating for a vibration.

When the state of the objective lens system changes due to a focusing operation, as shown in FIG. 5, an object distance is detected by an object distance detection unit 107, and a first calculation unit 108 calculates a focusing shift amount of a focusing lens group 111 on the basis of the object distance signal. Based on this calculated value, a focusing unit 109 shifts the focusing lens group 111 along the optical axis, thus performing a focusing operation.

Meanwhile, a second calculation unit 116 calculates the drive amount x of the anti-vibration lens group 102 on the basis of the calculated value from the first calculation unit 108 and the signal from the vibration detection unit 103. The vibration compensation unit 104 is driven based on the drive amount x to decenter the anti-vibration lens group 102 in the direction perpendicular to the optical axis, thereby compensating for a vibration.

Alternatively, the same focusing operation as in FIG. 5 is performed, and as shown in FIG. 6, the second calculation unit 116 calculates the drive amount x of the anti-vibration lens group 102 on the basis of the object distance signal from the object distance detection unit 107 and the signal from the vibration detection unit 103. The vibration compensation unit 104 is driven based on the drive amount x to decenter the anti-vibration lens group 102 in the direction perpendicular to the optical axis, thereby compensating for a vibration. These cases are suitable for a case wherein the objective lens system is used for an auto-focus system.

When the objective lens system comprises a variable focal-length lens group (hereinafter referred to simply as a "variable focal-length lens"), and the state of the objective lens system changes due to a focusing operation, as shown in FIG. 7, the first calculation unit 108 calculates a focusing shift amount of the focusing lens group 111 on the basis of the focal length signal from the focal length detection unit 115 and the object distance signal from the object distance detection unit 107, and the focusing lens group 111 is shifted using the focusing unit 109 on the basis of the calculated value, thus performing a focusing operation.

Meanwhile, the second calculation unit 116 calculates the drive amount x of the anti-vibration lens group 102 on the basis of the calculated value from the first calculation unit 108, the signal from the vibration detection unit 103, and the signal from the focal length detection unit 115. The vibration compensation unit 104 is driven based on the drive amount x to decenter the anti-vibration lens group 102 in the direction perpendicular to the optical axis, thereby compensating for a vibration.

Alternatively, the same focusing operation as in FIG. 7 is performed, and as shown in FIG. 8, the second calculation unit 116 calculates the drive amount x of the anti-vibration lens group 102 on the basis of the signal from the object distance detection unit 107, the signal from the vibration detection unit 103, and the signal from the focal length detection means 115. The vibration compensation unit 104 is driven based on the drive amount x to decenter the anti-vibration lens group 102 in the direction perpendicular to the optical axis, thereby compensating for a vibration.

These cases are suitable for a lens system adopting a so-called variable focal lens such as an inner-focus type lens, a rear-focus type lens, or the like, in which the shift amount of the focusing lens group varies in correspondence with different focal length states of the objective lens system with respect to a single object distance.

In the case of a lens system in which the shift amount of the focusing lens group becomes constant in correspondence with different focal length states of the objective lens system with respect to a single object distance, e.g., a zoom lens system in which the most-object side lens group of the objective lens system is shifted in a focusing operation, as shown in FIG. 9, the first calculation unit 108 calculates the focusing shift amount of the focusing lens group 111 on the basis of the object distance signal from the object distance detection unit 107, and the focusing lens group 111 is shifted using the focusing unit 109 on the basis of the calculated value, thus performing a focusing operation.

Meanwhile, the second calculation unit 116 calculates the drive amount x of the anti-vibration lens group 102 on the basis of the object distance signal from the object distance detection unit 107, the signal from the vibration detection unit 103, and the focal length signal from the focal length detection unit 115. The vibration compensation unit 104 is driven based on the drive amount x to decenter the anti-vibration lens group 102 in the direction perpendicular to the optical axis, thereby compensating for a vibration.

In this case as well, the second calculation unit 116 may calculate the drive amount x of the anti-vibration lens group 102 on the basis of the calculated value from the first calculation unit 108 in place of the object distance signal from the object distance detection unit 107, and the vibration compensation unit 104 may be driven based on the drive amount x to decenter the anti-vibration lens group 102 in the direction perpendicular to the optical axis, thus compensating for a vibration.

Note that the first and second calculation unit have been separately described in correspondence with their calculation functions. However, these functions may be integrated on a single CPU chip. The object distance detection unit may comprise, e.g., (i) an infrared system or a passive phase difference detection system using triangulation, (ii) a sonar system using sonic waves, radio waves or rays, or the like, (iii) a distance encoder provided to a focusing ring of a TTL auto-focus camera lens, or the like.

DETAILED DESCRIPTION OF THE PREFERRED EMBODIMENTS

The preferred embodiments of the present invention will be described hereinafter. In the description of each embodiment, assume that in each lens group, the primary principal point coincides with the primary nodal point, and the secondary principal point coincides with the secondary nodal point, for the sake of simplicity.

First Embodiment

In the first embodiment, the present invention is applied to an inner-focus type lens system adopting a three-group arrangement in which a third lens group G3 is used as an anti-vibration lens group, and a second lens group G2 is used as a focusing lens group.

Table 1 below shows data of the first embodiment. Table 1 shows the i-th lens groups Gi (i=1, 2, 3) in the order from the object side in the leftmost column, and also shows the refracting powers $\phi i$ of the lens groups, the principal point intervals e0i in the reference state (RL=∞), and the shift amount $\delta 2$ of the focusing lens group.

The principal point thickness ti in Table 1 represents the distance from the primary principal point Hi to the secondary principal point Hi' of the i-th lens group, RL represents the distance from the object point to the image plane, and f represents the focal length of the entire lens system when RL=∞.

TABLE 1

| Data of First Embodiment | | | |
|---|---|---|---|
| f = 500 | | | |
| Group | Refracting Power | Principal Point Interval | Principal Point Thickness |
| G1 | $\phi 1$ = 0.003636 | e01 = 159.5000 | t1 = 15.6669 |
| G2 | $\phi 2$ = −0.008658 | e02 = 43.0000 | t2 = 6.2355 |
| G3 | $\phi 3$ = 0.004762 | e03 = 210.0000 | t3 = 3.3160 |

Data associated with the focusing shift amount $\delta 2$ of the second lens group G2 are as follows:

| When RL = ∞ | $\delta 2$ = 0 |
|---|---|
| When RL = 15727.7335 | $\delta 2$ = −5.0336 |
| When RL = 5000.0000 | $\delta 2$ = −17.6394 |

Figure 1:
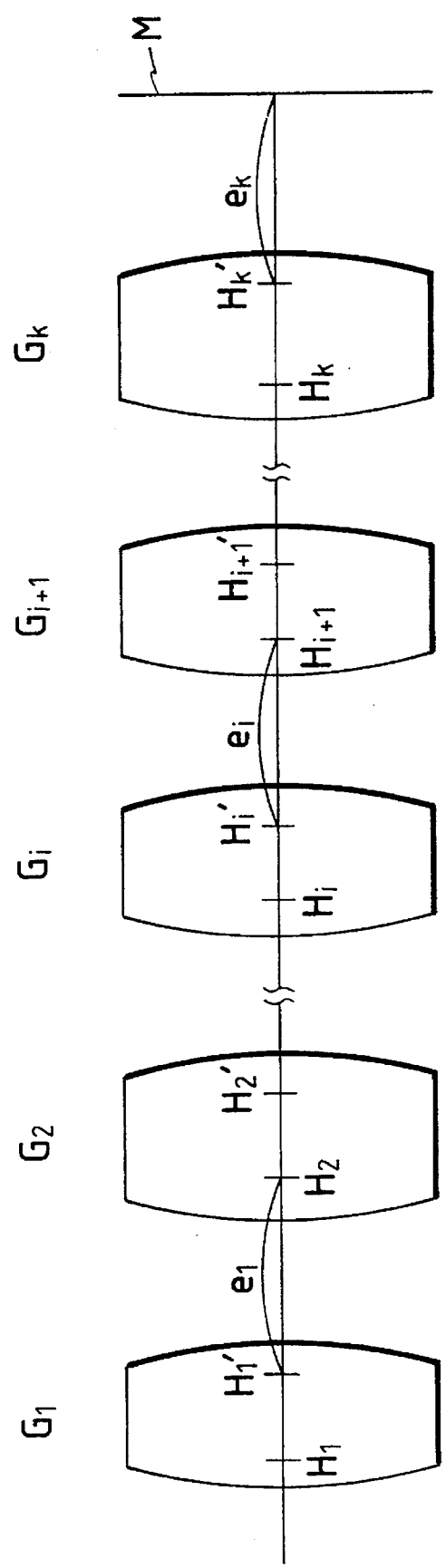
FIG. 1 is a view illustrating the state of a multi-group arrangement lens.
Figure 2:
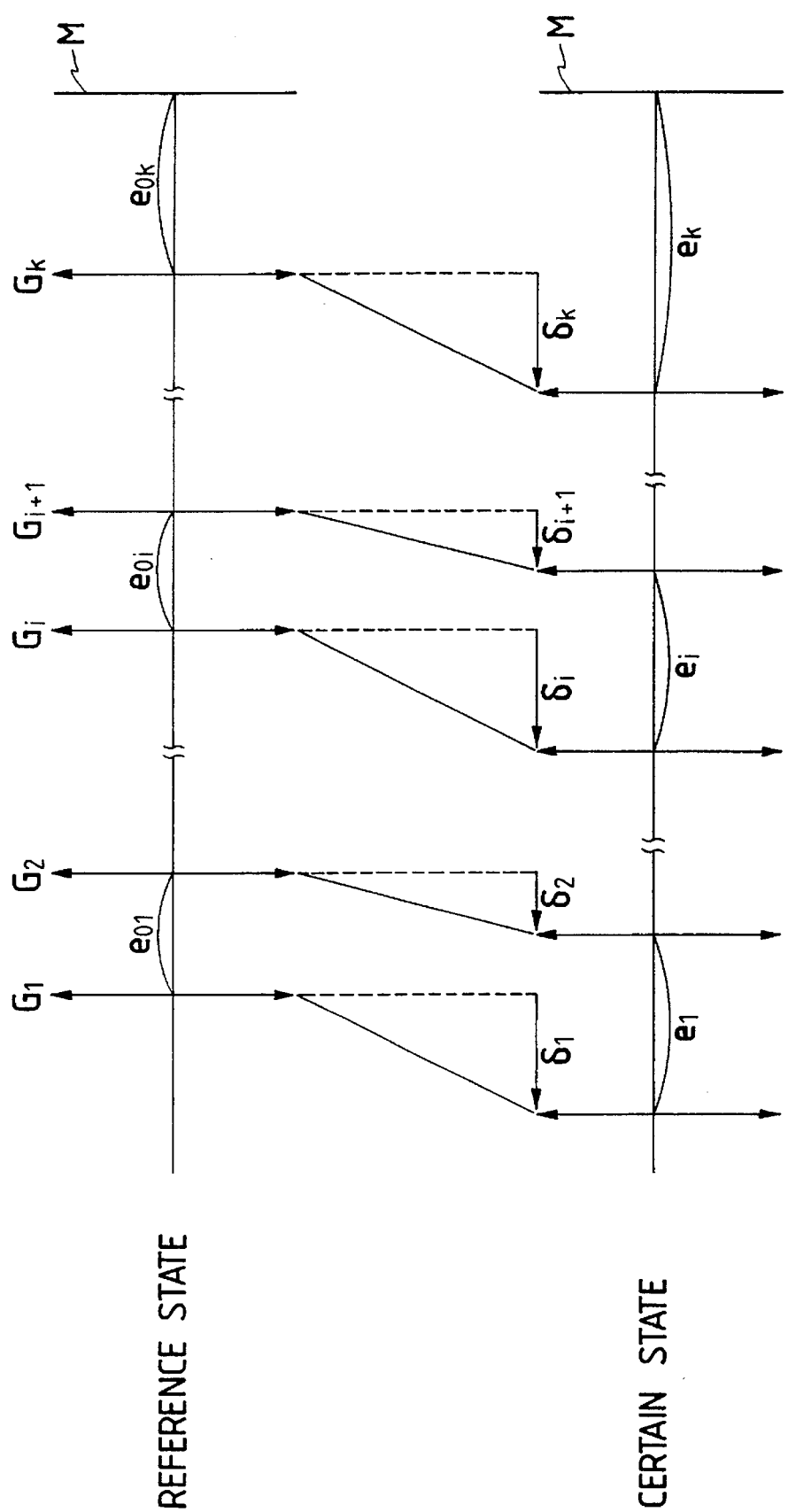
FIG. 2 is a view illustrating cases wherein the multi-group arrangement lens is in a reference state and a certain state, respectively.
Figure 3:
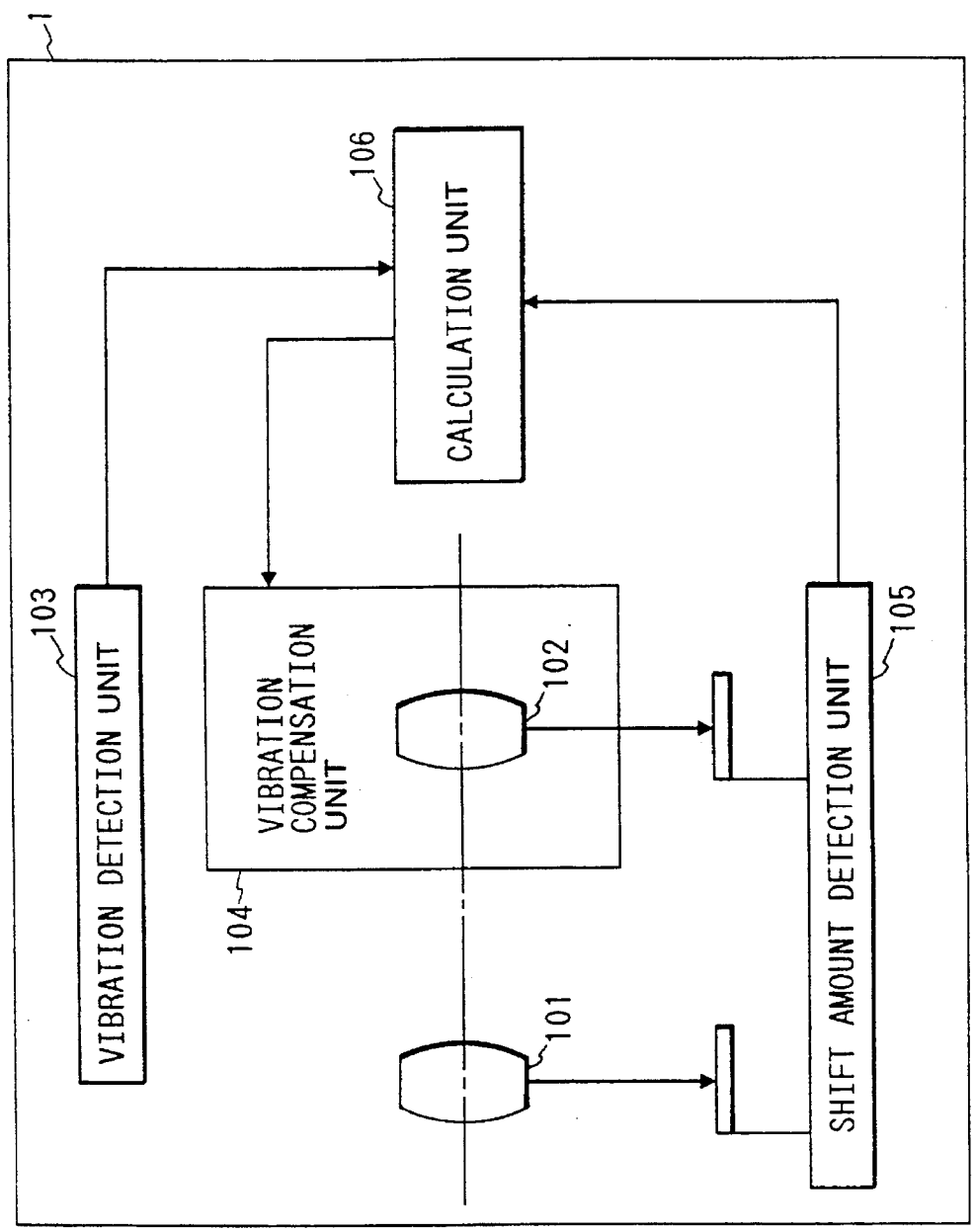
FIG. 3 is a diagram showing the arrangement of the present invention when a lens group in an objective lens system is shifted along the optical axis.
Figure 4:
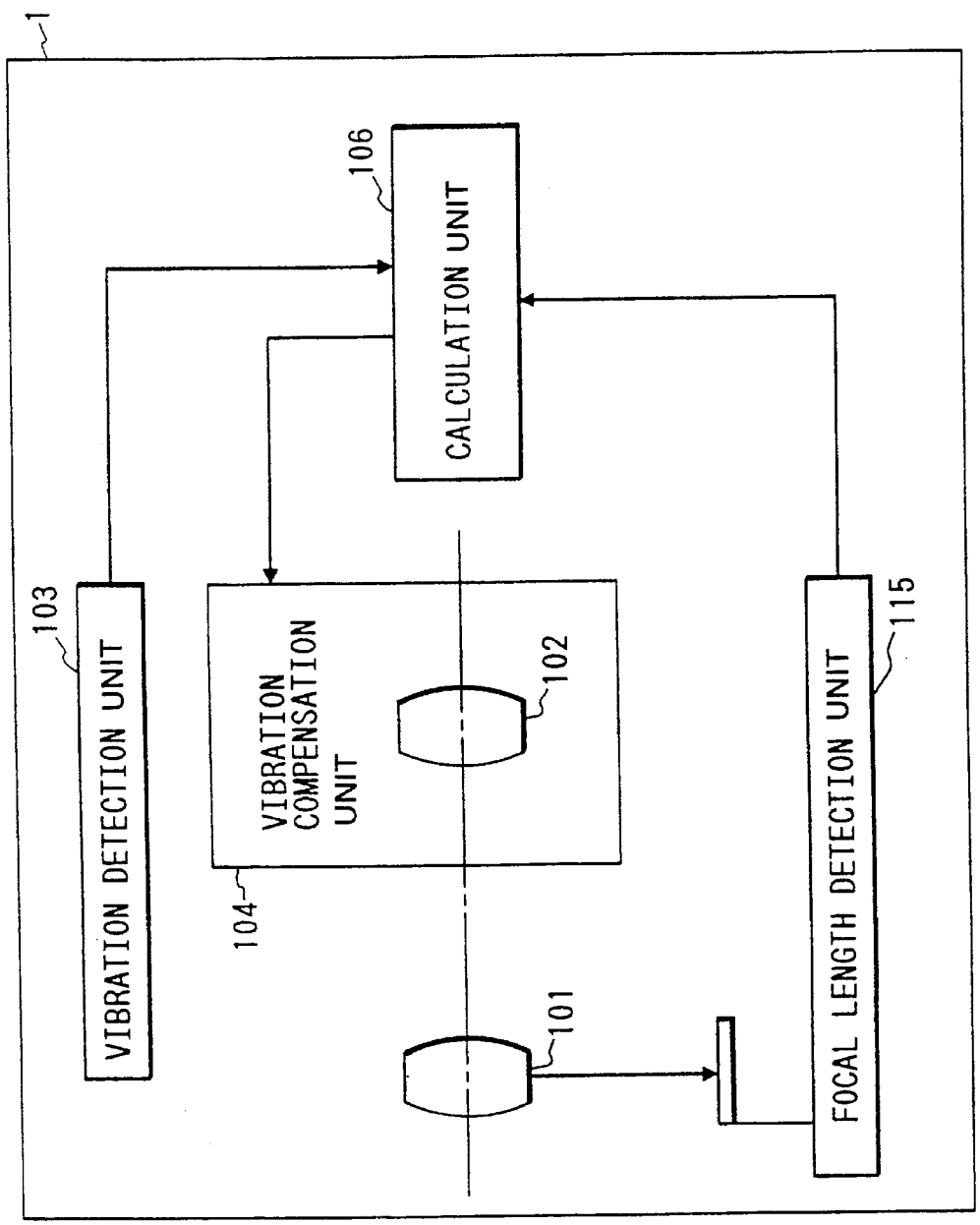
FIG. 4 is a diagram showing the arrangement of the present invention for a variable focal-length lens.
Figure 5:
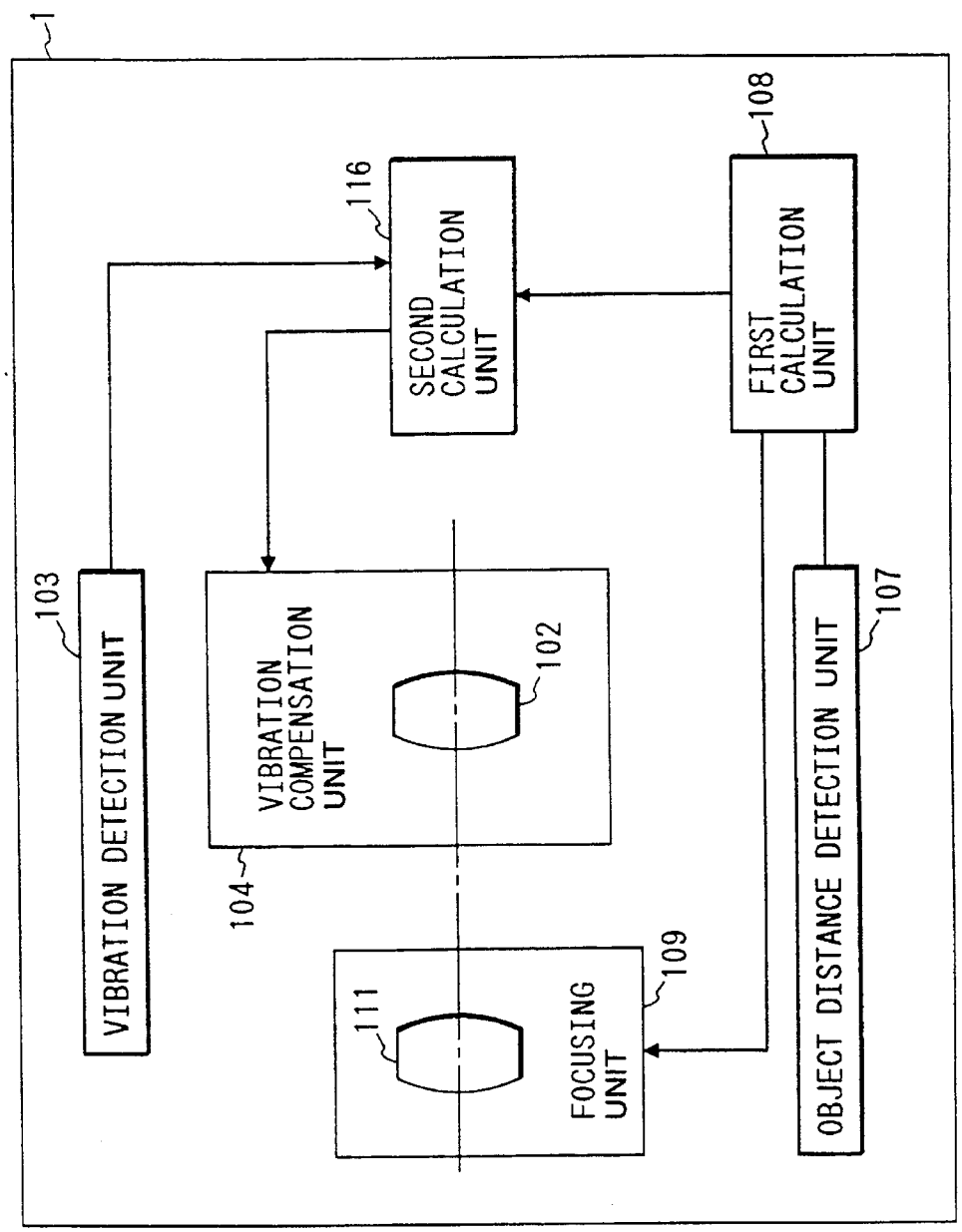
FIG. 5 is a diagram showing the arrangement of the present invention when the state of the objective lens system changes due to a focusing operation.
Figure 6:
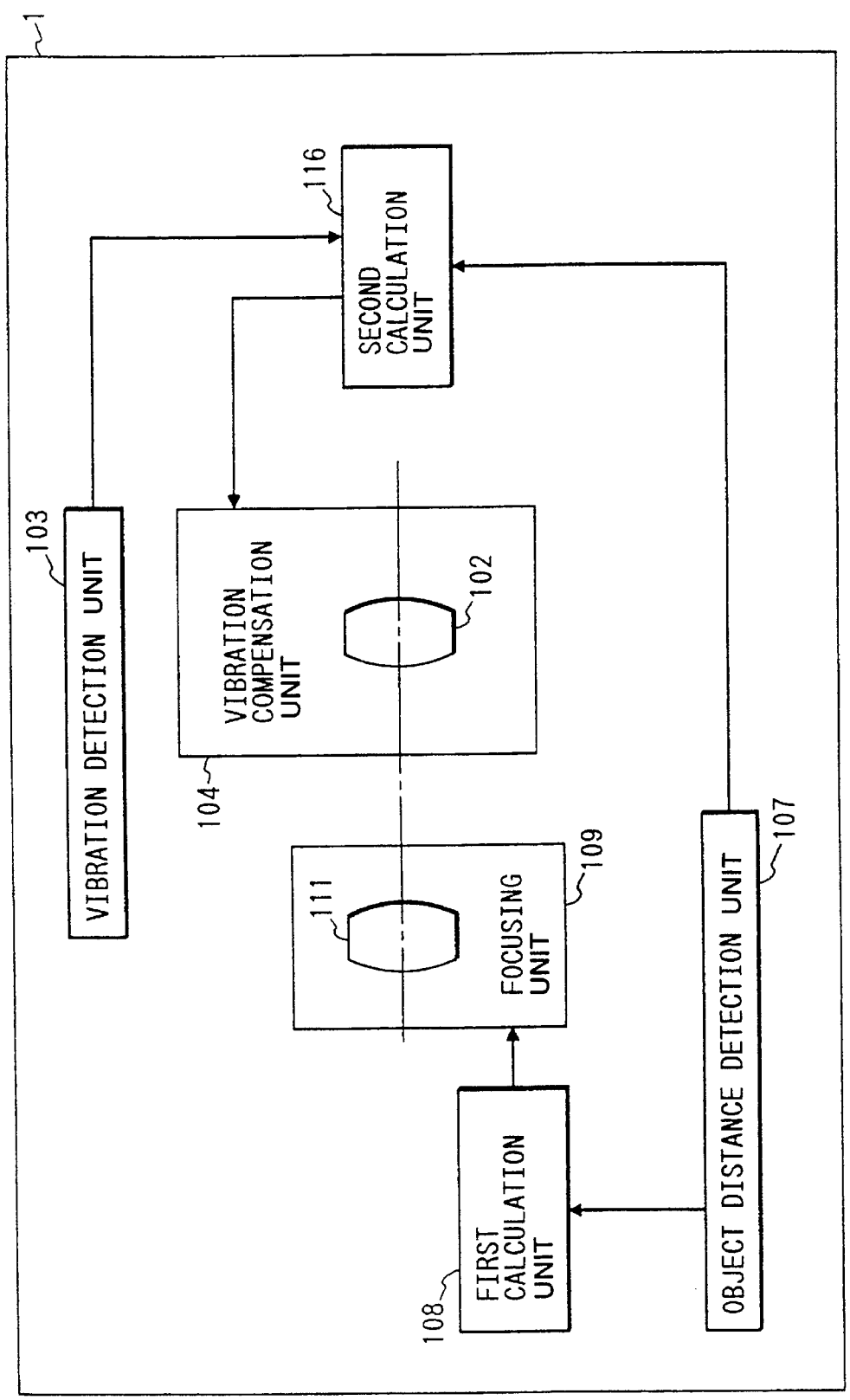
FIG. 6 is a diagram showing the arrangement of the present invention when the state of the objective lens system changes due to a focusing operation.
Figure 7:
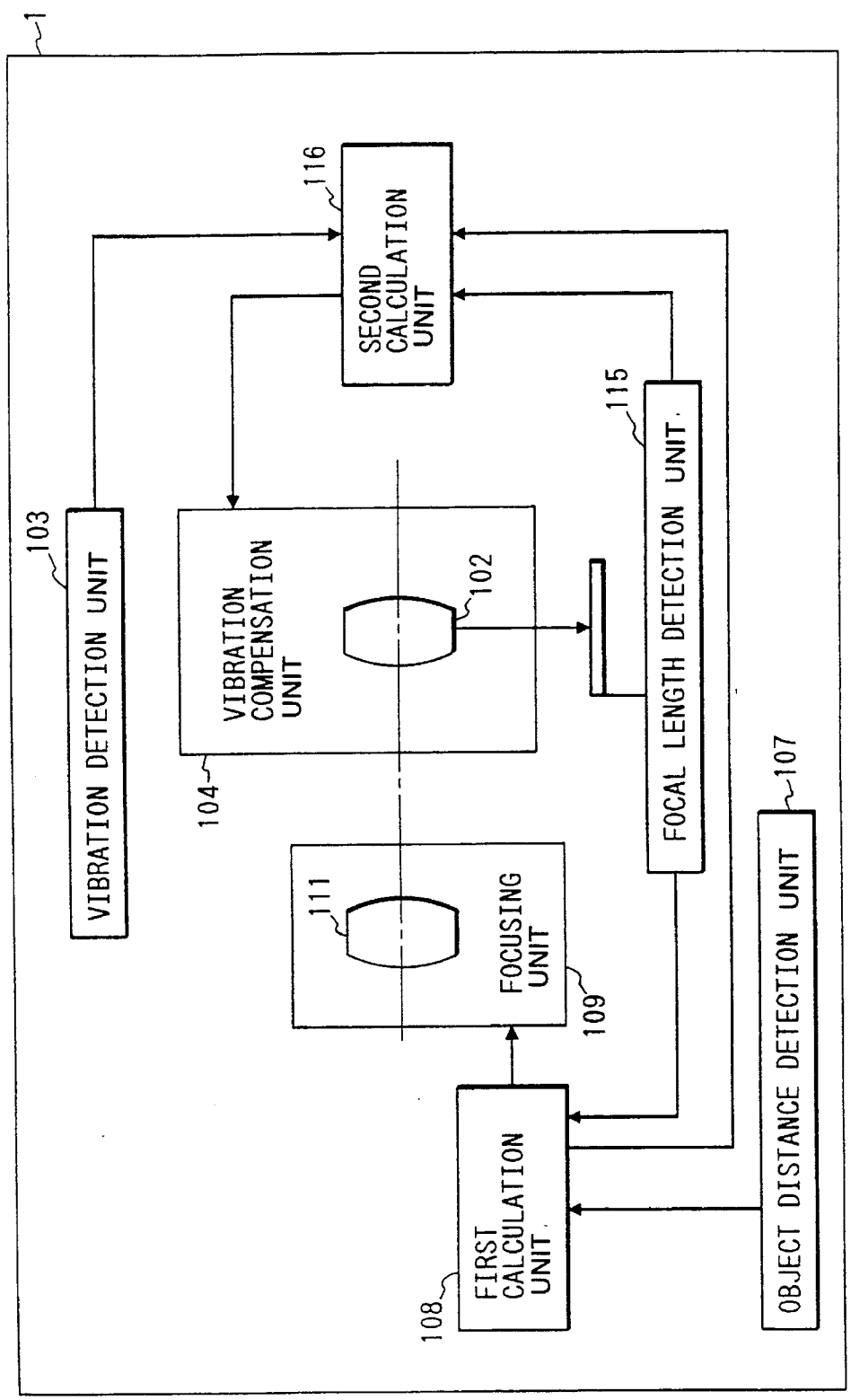
FIG. 7 is a diagram showing the arrangement of the present invention when the objective lens system comprises a variable focal-length lens and the state of the objective lens system changes due to a focusing operation.
Figure 8:
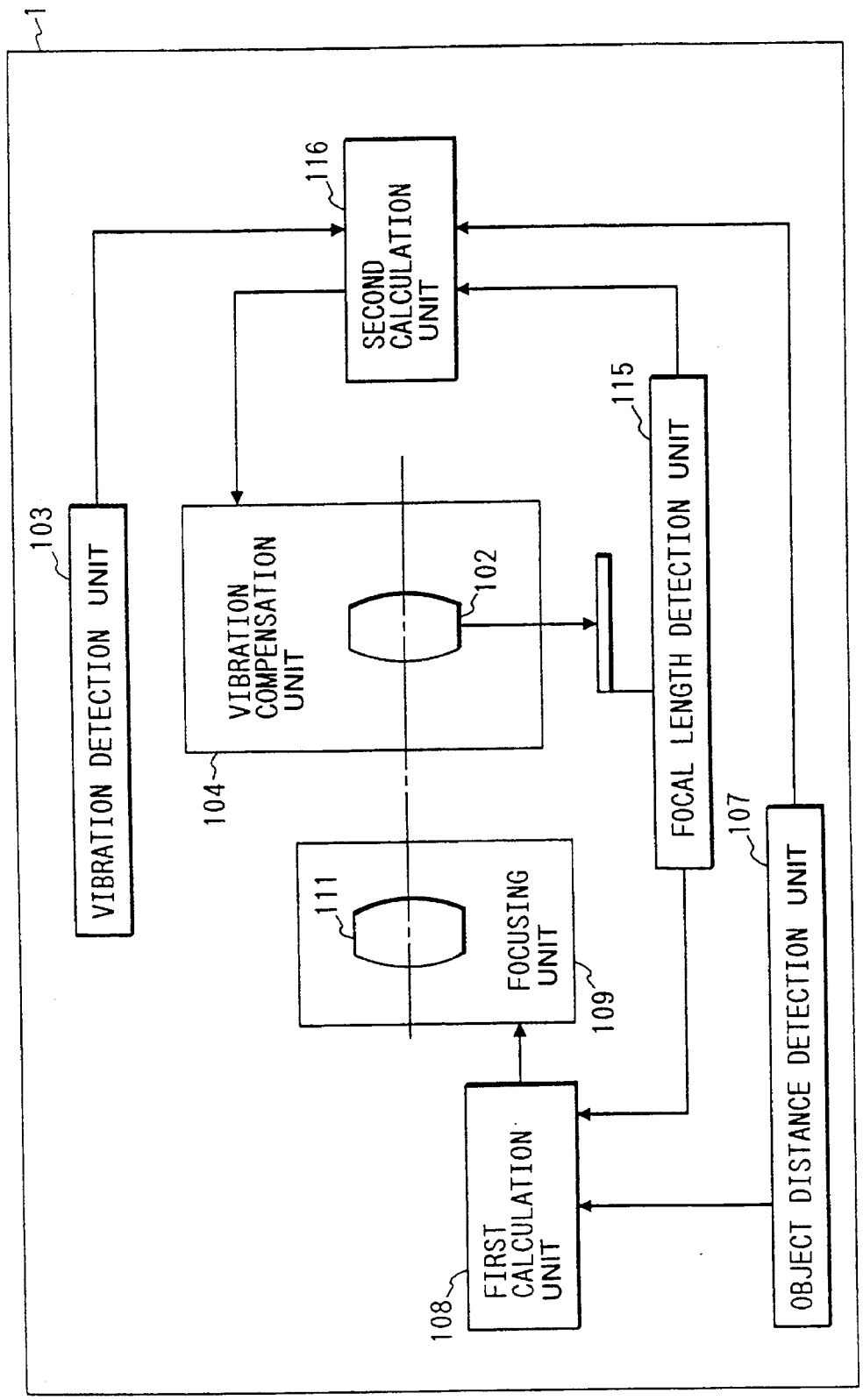
FIG. 8 is a diagram showing the arrangement of the present invention when the objective lens system comprises a variable focal-length lens and the state of the objective lens system changes due to a focusing operation.
Figure 9:
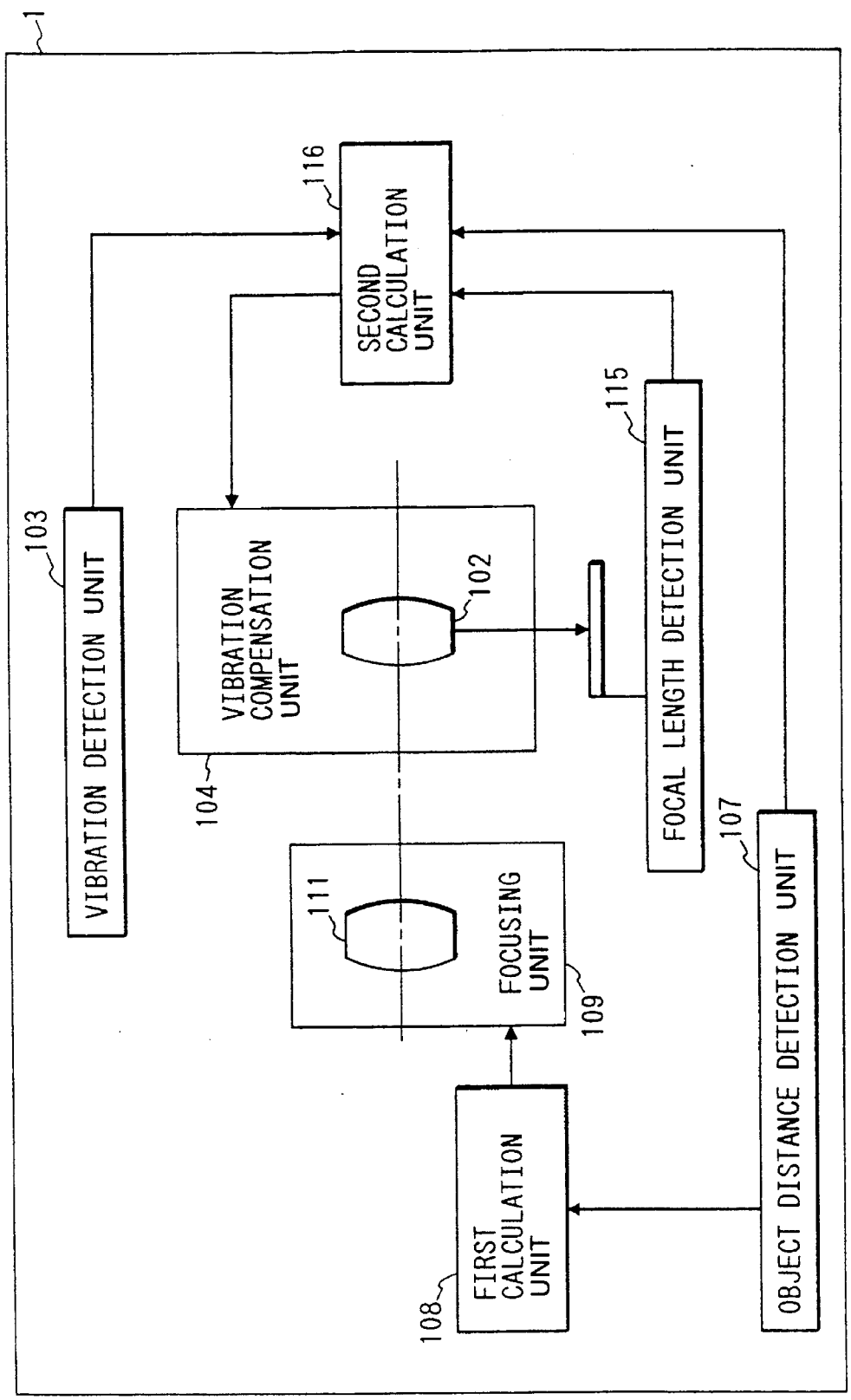
FIG. 9 is a diagram showing the arrangement of the present invention when the shift amount of a focusing lens group becomes constant when a zooming operation is performed with a constant object distance.
Figure 10:
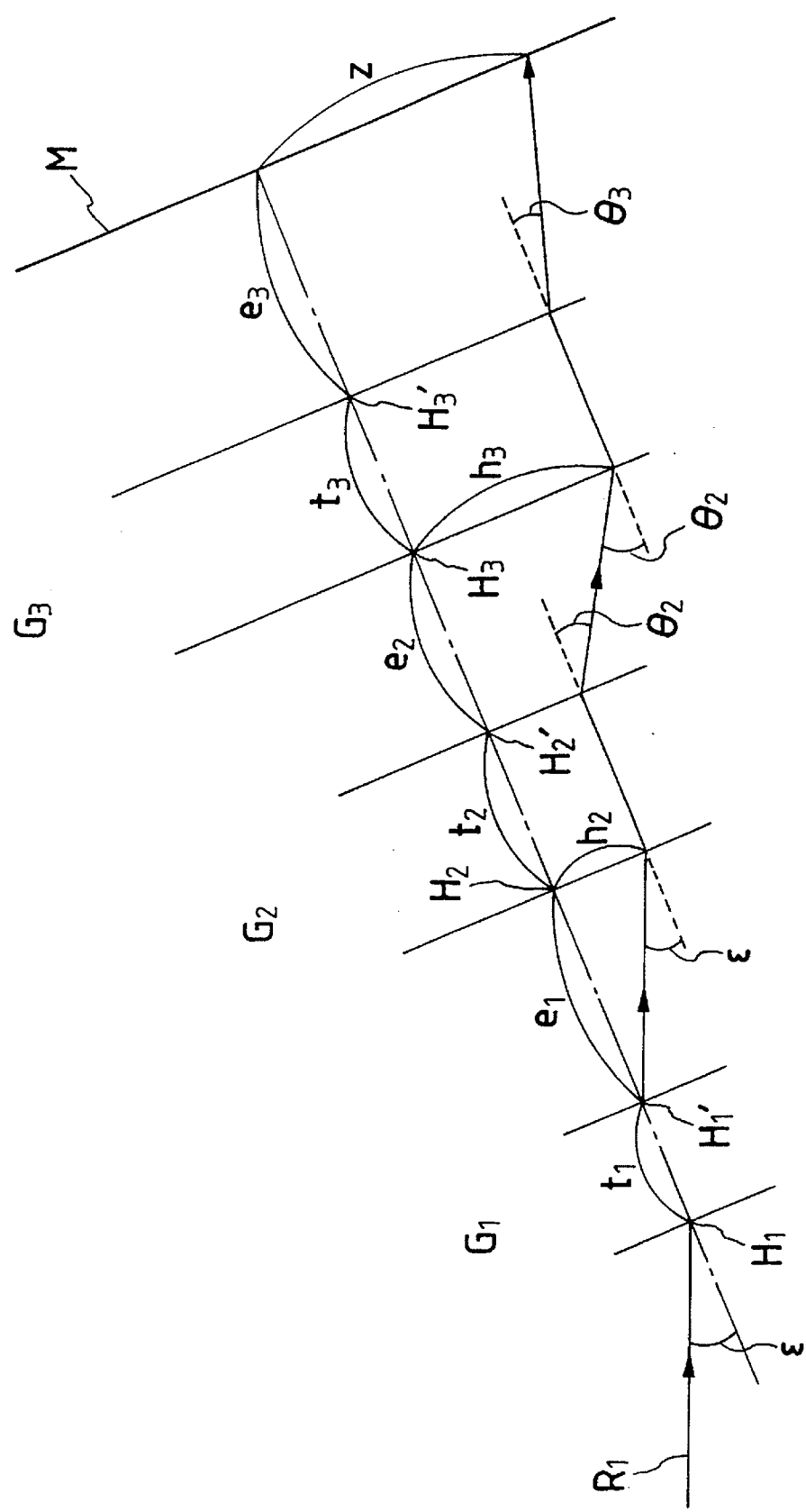
FIG. 10 is a view illustrating a state wherein a lens system according to the first embodiment of the present invention is inclined.

FIG. 10 shows a state wherein the above-mentioned objective lens system of the first embodiment is inclined at an angle $\epsilon$ in a plane including the optical axis to have the primary principal point H1 of the first lens group G1 as the center of rotation.

A paraxial ray R1 is incident on the principal point of the first lens group G1 at an angle $\epsilon$ with respect to the optical axis of the objective lens. The exit angle of the paraxial ray R1 from the first lens group G1 is also an angle $\epsilon$, and a height h2, from the optical axis, of the paraxial ray R1 incident on the second lens group G2 is given by $h2=-e1 \cdot \tan \epsilon$.

In this case, if $\epsilon$ is a sufficiently small value, tan $\epsilon$ can be approximated to tan $\epsilon = \epsilon$. At this time, the height h2, from the optical axis, of the paraxial ray R1 incident on the second lens group G2 is given by $h2=-e1 \cdot \epsilon$. Since the incident angle of the paraxial ray R1 to the second lens group G2 is $\epsilon$, and the paraxial ray R1 is refracted by $h2 \cdot \phi 2$ by the second lens group G2, an exit angle $\theta 2$ of the paraxial ray R1 from the second lens group G2 is given by $\theta 2 = \epsilon + h2 \cdot \phi 2 = (1-e1 \cdot \phi 2) \cdot \epsilon$.

Similarly, a height h3, from the optical axis, of the paraxial ray incident on the third lens group G3, and an exit angle $\theta 3$ from the third lens group G3 are respectively given by:

$$h3 = h2 - e2 \cdot \theta 2 = -(e1 + e2 - e1 \cdot e2 \cdot \phi 2) \cdot \epsilon$$
$$\theta 3 = \theta 2 + h3 \cdot \phi 3$$
$$= (1 - e1 \cdot \phi 2 - e1 \cdot \phi 3 - e2 \cdot \phi 3 + e1 \cdot e2 \cdot \phi 2 \cdot \phi 3) \cdot \epsilon$$

Furthermore, a height z (corresponding to a deviation amount on the image plane), from the optical axis, of the paraxial ray R1 incident on the image plane M is given by:

$$z = h3 - e3 \cdot \theta 3$$
$$= -\{e1 + e2 + e3 - (e2 + e3) \cdot e1 \cdot \phi 2 - (e1 + e2) \cdot e3 \cdot \phi 3 + e1 \cdot e2 \cdot e3 \cdot \phi 2 \cdot \phi 3\} \cdot \epsilon$$

Figure 11:
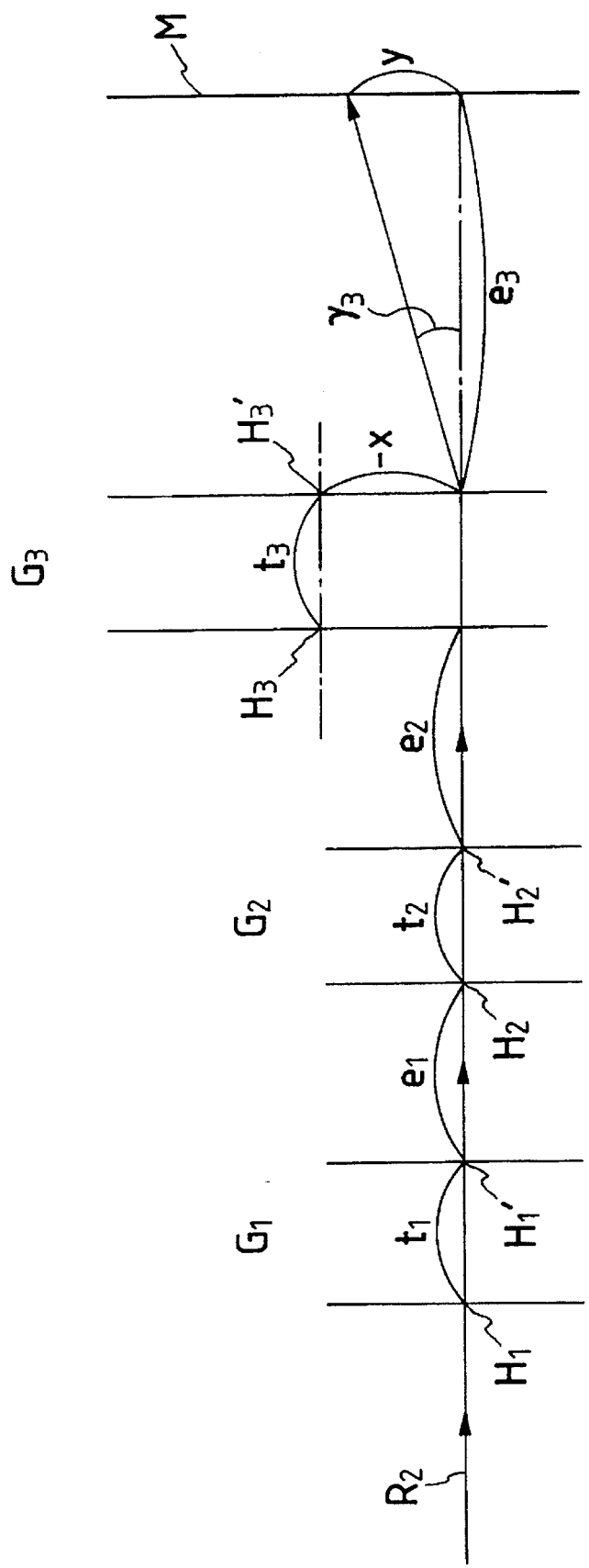
FIG. 11 is a view illustrating a state wherein an anti-vibration lens group in the lens system according to the first embodiment of the present invention is decentered.

FIG. 11 shows a state wherein the third lens group G3 as the anti-vibration lens group is decentered by x in the direction perpendicular to the optical axis.

When a paraxial ray R2 is incident along the optical axis toward the center of the first lens group G1, the paraxial ray R2 propagates along the optical axis without being refracted by the first and second lens groups G1 and G2, and is incident on the third lens group G3. Since the third lens group G3 is decentered by x from the optical axis, the height, from the optical axis, of the ray incident on the third lens group is −x.

At this time, an exit angle $\gamma 3$ of the paraxial ray R2 refracted by the third lens group G3 is given by $\gamma 3 = -x \cdot \phi 3$, and a height y (corresponding to a deviation amount on the image plane), from the optical axis, of the paraxial ray R2 incident on the image plane M is given by:

$$y = -e3 \cdot \gamma 3 = e3 \cdot \phi 3 \cdot x$$

As described above, the anti-vibration operation can be performed when the deviation amounts z and y satisfy z+y=0. Therefore, the decentering amount x (to be referred to as a vibration compensation amount x hereinafter) is expressed by:

$$x=[\{e1+e2+e3-(e2+e3) \cdot e1 \cdot \phi 2-(e1+e2) \cdot e3 \cdot \phi 3+e1 \cdot e2 \cdot e3 \cdot \phi 2 \cdot \phi 3\}/(e3 \cdot \phi 3)] \cdot \epsilon$$

When the second lens group G2 is shifted by the focusing shift amount $\delta 2$ by the focusing operation, if the principal point intervals are substituted as follows:

$$e1=e01-\delta 2$$
$$e2=e02+\delta 2$$
$$e3=e03$$

then, the vibration compensation amount x in an arbitrary focusing state is expressed by equation (5) below:

$$x = [\{e01 + e02 + e03 - (e02 + \delta2 + e03) \cdot (e01 - \delta2) \cdot \phi2 - (e01 + e02) \cdot e03 \cdot \phi3 + (e01 - \delta2) \cdot (e02 + \delta2) \cdot e03 \cdot \phi2 \cdot \phi3\}/(e03 \cdot \phi3)] \cdot \epsilon \quad (5)$$

In equation (5), since e01, e02, e03, $\phi1$, $\phi2$, and $\phi3$ are constants, the vibration compensation amount x is expressed as a function of the inclination angle $\epsilon$ and the focusing shift amount $\delta2$, and equation (5) can be modified as equation (6) below:

$$x = (A1 \cdot \delta2^2 + A2 \cdot \delta2 + A3) \cdot \epsilon \quad (6)$$

where A1, A2, and A3 are constants.

In the first embodiment of the present invention, A1=0, A2=-1.8182, and A3=500.00.

Therefore, when the focusing shift amount $\delta2$ is obtained from the shift amount detection unit, and the inclination angle $\epsilon$ is obtained from the vibration detection unit, the vibration compensation amount x as the shift amount of the vibration compensation unit can be obtained by a calculation. Note that the focusing shift amount $\delta2$ is expressed as a function of the object distance RL.

In the objective lens system of the first embodiment, the first and second lens groups construct an afocal system, and the focusing shift amount $\delta2$ with respect to the object distance RL is given by equation (7) below:

$$\delta2 = -1/[\phi1^2 \cdot \{RL - e01 - e02 - e03 - t1 - t2 - t3 - (1/\phi1)\}] \quad (7)$$

Since $\phi1$, e01, e02, e03, t1, t2, and t3 in equation (7) are constants, and the focusing shift amount $\delta2$ is a function of the object distance RL, equation (7) can be modified as equation (8) below:

$$\delta2 = -1(B1 \cdot RL + B2) \quad (8)$$

where B1 and B2 are constants.

In the first embodiment of the present invention, B1=0.00001322 and B2=-0.00942249, and hence, when the object distance RL is obtained from the object distance detection unit, the focusing shift amount $\delta2$ can be obtained by a calculation.

From equations (6) and (8), equation (9) below can be obtained:

$$x = \{A1/(B1 \cdot RL + B2)^2 - A2/(B1 \cdot RL + B2) + A3\} \cdot \epsilon \quad (9)$$

When equation (9) above is used, the vibration compensation amount x as the shift amount of the vibration compensation unit can be calculated based on the inclination angle $\epsilon$ from the vibration detection unit, and the object distance RL from the object distance detection unit.

Table 2 below shows the shift amount of the third lens group G3 as the anti-vibration lens group when the objective lens system of the first embodiment is inclined at the inclination angle $\epsilon$. In Table 2, $\epsilon$ is the inclination angle of the lens, RL is the object distance, and x is the vibration compensation amount of the anti-vibration lens group.

TABLE 2

|  | $\epsilon = 0.0025$rad | $\epsilon = 0.0050$rad | $\epsilon = 0.0075$rad |
| --- | --- | --- | --- |
| RL = $\infty$ | x = 1.2500 | x = 2.5000 | x = 3.7500 |
| RL = 15727.7335 | x = 1.2729 | x = 2.5458 | x = 3.8187 |
| RL = 5000.0000 | x = 1.3302 | x = 2.6604 | x = 3.9905 |

From Table 2, according to the first embodiment of the present invention, an optimal vibration compensation amount can be obtained in accordance with the object distance and the vibration amount of the objective lens system.

Second Embodiment

In the second embodiment, the present invention is applied to a two-group arrangement variable focal-length lens system in which the second lens group G2 is used as an anti-vibration lens group, and the first lens group G1 is used as a focusing lens group.

Table 3 below shows data of the second embodiment. Table 3 shows the i-th lens groups Gi (i=1, 2) in the order from the object side in the leftmost column, and also shows the refracting powers $\phi i$ of the lens groups, the principal point intervals e0i in the reference state (f=36.0696, RL=$\infty$), and the shift amounts $\delta1$ and $\delta2$ of the lens groups when the focal length is changed and the focusing operation is performed. The principal point thickness ti in Table 3 represents the distance from the primary principal point Hi to the secondary principal point Hi' of the i-th lens group, RL represents the distance from the object point to the image plane, and f represents the focal length of the entire lens system when RL=$\infty$.

TABLE 3

| Data of Second Embodiment | | | |
| --- | --- | --- | --- |
| f = 36.0696 to 68.0808 | | Principal | |
| Group | Refracting Power | Point Interval (f = 36.0696) | Principal Point Thickness |
| G1 | $\phi1 = 0.037427$ | e01 = 19.2700 | t1 = 4.7063 |
| G2 | $\phi2 = -0.034807$ | e02 = 10.0553 | t2 = 1.5985 |

Data associated with the shift amounts $\delta1$ and $\delta2$ of the first and second lens groups G1 and G2 from the reference state are as follows:

| At f = 36.0696 | | |
| --- | --- | --- |
| When RL = $\infty$ | $\delta1 = 0$ | $\delta2 = 0$ |
| When RL = 1400.0000 | $\delta1 = 0.5339$ | $\delta2 = 0$ |
| When RL = 1000.0000 | $\delta1 = 0.7620$ | $\delta2 = 0$ |
| When RL = 750.0000 | $\delta1 = 1.0397$ | $\delta2 = 0$ |
| At f = 49.9990 | | |
| When RL = $\infty$ | $\delta1 = 9.0493$ | $\delta2 = 14.9783$ |
| When RL = 1400.0000 | $\delta1 = 9.5868$ | $\delta2 = 14.9783$ |
| When RL = 1000.0000 | $\delta1 = 9.8187$ | $\delta2 = 14.9783$ |
| When RL = 750.0000 | $\delta1 = 10.1029$ | $\delta2 = 14.9783$ |
| At f = 68.0808 | | |
| When RL = $\infty$ | $\delta1 = 24.4150$ | $\delta2 = 34.4216$ |
| When RL = 1400.0000 | $\delta1 = 24.9588$ | $\delta2 = 34.4216$ |
| When RL = 1000.0000 | $\delta1 = 25.1974$ | $\delta2 = 34.4216$ |
| When RL = 750.0000 | $\delta1 = 25.4931$ | $\delta2 = 34.4216$ |

Figure 12:
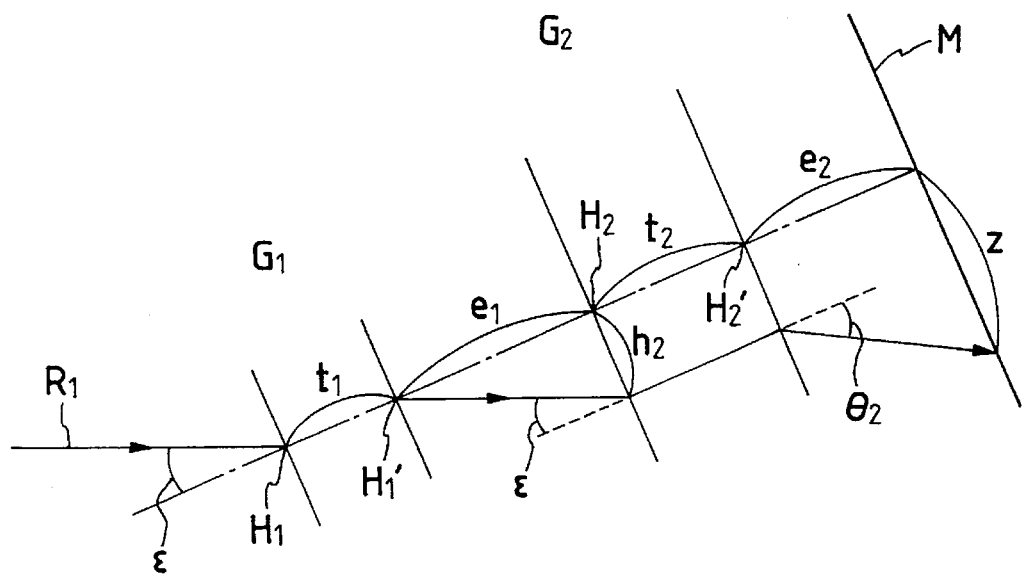
FIG. 12 is a view illustrating a state wherein a lens system according to the second to fourth embodiments of the present invention is inclined.

FIG. 12 shows a state wherein the lens system of the second embodiment is inclined at an angle $\epsilon$ in a plane including the optical axis to have the primary principal point H1 of the first lens group G1 as the center of rotation.

A paraxial ray R1 is incident on the principal point of the first lens group G1 at an angle $\epsilon$ with respect to the optical axis. The exit angle of the paraxial ray R1 from the first lens group G1 is $\epsilon$, and a height h2, from the optical axis, of the paraxial ray R1 incident on the second lens group G2 is given by h2=-e1·tan $\epsilon$. If $\epsilon$ is a sufficiently small value, tan $\epsilon$ can be approximated to tan $\epsilon = \epsilon$. At this time, the height h2, from the optical axis, of the paraxial ray R1 incident on the second lens group G2 is given by $h2=-e1\cdot\epsilon$.

Since the incident angle of the paraxial ray R1 to the second lens group G2 is $\epsilon$, and the paraxial ray R1 is refracted by $h2\cdot\phi2$ by the second lens group G2, an exit angle $\theta2$ of the paraxial ray R1 from the second lens group G2 is given by $\theta2=\epsilon+h2\cdot\phi2=(1-e1\cdot\phi2)\cdot\epsilon$.

Furthermore, a height z (corresponding to a deviation amount on the image plane), from the optical axis, of the paraxial ray R1 incident on the image plane M is given by:

$$\begin{aligned} z &= h2 - e2\cdot\theta2 \\ &= -(e1 + e2 - e1\cdot e2\cdot\phi2)\cdot\epsilon \end{aligned}$$

Figure 13:
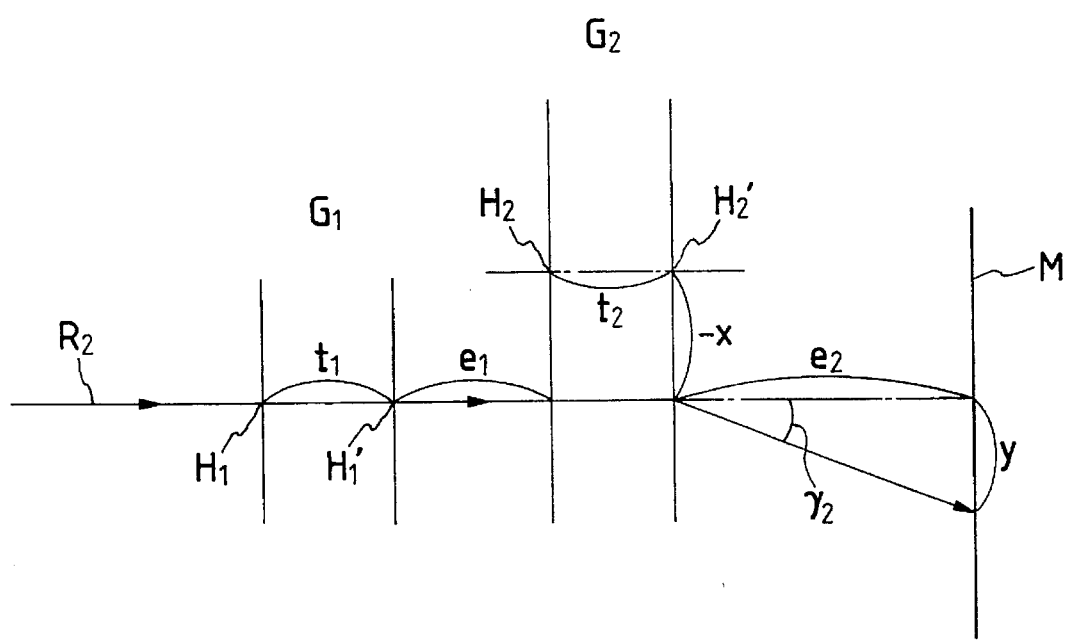
FIG. 13 is a view illustrating a state wherein an anti-vibration lens group in the lens system according to the second to fourth embodiments of the present invention is decentered.

FIG. 13 shows a state wherein the second lens group G2 as the anti-vibration lens group is decentered by x in the direction perpendicular to the optical axis.

When a paraxial ray R2 is incident along the optical axis toward the center of the first lens group G1, the paraxial ray R2 propagates along the optical axis without being refracted by the first lens group G1, and is incident on the second lens group G2. Since the second lens group G2 is decentered by x from the optical axis, the height, from the optical axis, of the ray incident on the second lens group is $-x$.

At this time, an exit angle $\gamma2$ of the paraxial ray R2 refracted by the second lens group G2 is given by $\gamma2=-x\cdot\phi2$. A height y (corresponding to a deviation amount on the image plane), from the optical axis, of the paraxial ray R2 incident on the image plane M is given by:

$$y=-e2\cdot\gamma2=e2\cdot\phi2\cdot x$$

As described above, the anti-vibration operation can be performed when the deviation amounts z and y satisfy $z+y=0$. Therefore, the vibration compensation amount x is expressed by:

$$x=\{(e1+e2-e1\cdot e2\cdot\phi2)/(e2\cdot\phi2)\}\cdot\epsilon$$

Upon a change in focal length or upon execution of the focusing operation, when the first lens group G1 is shifted by the shift amount $\delta1$, and the second lens group G2 is shifted by the shift amount $\delta2$, if the principal point intervals are substituted as follows:

$$e1=e01+\delta1-\delta2$$

$$e2=e02+\delta2$$

then, the vibration compensation amount x in a predetermined focal length state and a predetermined focusing state is given by:

$$x=[\{e01+e02+\delta1-(e01+\delta1-\delta2)-(e02+\delta2)\cdot\phi2\}/\{(e02+\delta2)\cdot\phi2\}]\cdot(10)$$

Since e01, e02, and $\phi2$ in equation (10) are constants, the vibration compensation amount x is expressed as a function of the inclination angle $\epsilon$ and the shift amounts $\delta1$ and $\delta2$, and equation (10) can be modified as equation (11) below:

$$x=\{(C1\cdot\delta1\cdot\delta2+C2\cdot\delta2^2+C3\cdot\delta1+C4\cdot\delta2+C5)/(C6\cdot\delta2+C7)\}\cdot\epsilon \quad (11)$$

where C1, C2, ..., C7 are constants. In the second embodiment of the present invention, these constants are:
C1=0.034807, C2=−0.034807, C3=1.349995
C4=0.320736, C5=36.069700, C6=−0.034807
C7=−0.349995

Therefore, when the shift amounts $\delta1$ and $\delta2$ are obtained from the shift amount detection unit of the shiftable lens group, and the inclination angle $\epsilon$ is obtained from the vibration detection unit, the vibration compensation amount x as the shift amount of the vibration compensation unit can be obtained by a calculation.

Table 4 below shows the shift amount of the second lens group G2 as the anti-vibration lens group when the lens system of the second embodiment is inclined at the inclination angle $\epsilon$. In Table 4, $\epsilon$ is the inclination angle of the lens, RL is the object distance, and x is the vibration compensation amount of the anti-vibration lens group.

TABLE 4

|  | $\epsilon =$ 0.0025rad | $\epsilon =$ 0.0050rad | $\epsilon =$ 0.0075rad |
| --- | --- | --- | --- |
| f = 36.0696 | | | |
| RL = ∞ | x = −0.2576 | x = −0.5153 | x = −0.7729 |
| RL = 1400.0000 | x = −0.2628 | x = −0.5256 | x = −0.7884 |
| RL = 1000.0000 | x = −0.2650 | x = −0.5300 | x = −0.7950 |
| RL = 750.0000 | x = −0.2677 | x = −0.5353 | x = −0.8030 |
| f = 49.9990 | | | |
| RL = ∞ | x = −0.1435 | x = −0.2869 | x = −0.4304 |
| RL = 1400.0000 | x = −0.1463 | x = −0.2927 | x = −0.4390 |
| RL = 1000.0000 | x = −0.1476 | x = −0.2952 | x = −0.4428 |
| RL = 750.0000 | x = −0.1491 | x = −0.2982 | x = −0.4473 |
| f = 68.0808 | | | |
| RL = ∞ | x = −0.1099 | x = −0.2199 | x = −0.3298 |
| RL = 1400.0000 | x = −0.1122 | x = −0.2244 | x = −0.3365 |
| RL = 1000.0000 | x = −0.1132 | x = −0.2263 | x = −0.3395 |
| RL = 750.0000 | x = −0.1144 | x = −0.2288 | x = −0.3431 |

From Table 4, according to the second embodiment of the present invention, an optimal vibration compensation amount can be obtained in accordance with the vibration amount of the objective lens system, and the lens state having an object distance at a predetermined focal length.

Third Embodiment

In the third embodiment, the present invention is applied to a two-group arrangement variable focal-length lens in which the second lens group G2 is used as the anti-vibration lens group, and the first lens group G1 is used as the focusing lens group.

Table 5 below shows data of the third embodiment. Table 5 shows the i-th lens groups Gi (i=1, 2) in the order from the object side in the leftmost column, and also shows the refracting powers $\phi i$ of the lens groups, and the principal point intervals e0i in the reference state (f=68.0808, RL=∞). The principal point thickness ti in Table 5 represents the distance from the primary principal point Hi to the secondary principal point Hi' of the i-th lens group, RL represents the distance from the object point to the image plane, and f represents the focal length of the entire lens system when RL=∞.

In the third embodiment of the present invention, a change in principal point interval between the first and second lens groups G1 and G2 upon a change in focal length is represented by $\Delta e1$, a change in interval between the principal point of the second lens group G2 and the image plane is represented by $\Delta e2$, and the focusing shift amount of the first lens group G1 upon execution of a focusing operation is represented by $\delta1F$.

TABLE 5

Data of Third Embodiment

| Group | Refracting Power | Principal Point Interval (f = 68.0808) | Principal Point Thickness |
|---|---|---|---|
| G1 | $\phi 1 = 0.037427$ | e01 = 9.2634<br>$\Delta$e1 = 0<br>$\Delta$e1 = 4.0776<br>$\Delta$e1 = 10.0066 | t1 = 4.7063<br>(f = 68.0808)<br>(f = 49.9990)<br>(f = 36.0696) |
| G2 | $\phi 2 = -0.034807$ | e02 = 44.4769<br>$\Delta$e2 = 0<br>$\Delta$e2 = −19.4433<br>$\Delta$e2 = −34.4216 | t2 = 1.5985<br>(f = 68.0808)<br>(f = 49.9990)<br>(f = 36.0696) | f = 68.0808 to 36.0696

Data associated with the focusing shift amount of the first lens group G1 upon execution of a focusing operation are as follows:

| When RL = ∞ | $\delta 1F = 0$ |
|---|---|
| When RL = 1400.0000 | $\delta 1F = 0.5438$ |
| When RL = 1000.0000 | $\delta 1F = 0.7824$ |
| When RL = 750.0000 | $\delta 1F = 1.0781$ |

The vibration compensation amount x with respect to the inclination angle $\epsilon$ is expressed as follows as in the second embodiment:

$$x=\{(e1+e2-e1\cdot e2\cdot\phi 2)/(e2\cdot\phi 2)\}\cdot\epsilon \qquad (12)$$

for $$e1=e01+\Delta e1+\delta 1F \qquad (13)$$

$$e2=e02+\Delta e2 \qquad (14)$$

Note that the changes $\Delta$e1 and $\Delta$e2 in principal point interval upon a change in focal length are expressed as functions of the focal length f, and the focusing shift amount $\delta 1F$ of the first lens group upon execution of the focusing operation is expressed as a function of the object distance RL.

In the third embodiment of the present invention, the changes $\Delta$e1 and $\Delta$e2 in principal point interval and the focusing shift amount $\delta 1F$ are respectively given by:

$$\Delta e1=-1/(\phi 1\cdot\phi 2\cdot f)+1/\phi 1+1/\phi 2-e01 \qquad (15)$$

$$\Delta e2=-(\phi 1/\phi 2)\cdot f+1/\phi 2-e02 \qquad (16)$$

$$\delta 1F=1/[\phi 1^2\cdot\{RL-e01-e02-t1-t2-(1/\phi 1)\}] \qquad (17)$$

Upon deriving of equation (17), approximation is used under the assumption that the focusing shift amount $\delta 1F$ is sufficiently smaller than the object distance RL. Equation (17) expresses the focusing shift amount from the reference state, and assumes a slightly different value due to a change in total length in a focal length state other than the reference state.

However, when a change in total length is not so large, and a focusing operation is performed using the first lens group G1 as in the third embodiment of the present invention, even if a focusing operation is performed in other focal length states using the focusing shift amount in the longest focal length state, a sufficiently good image can be obtained.

When the values of the constants of the third embodiment are substituted in equations (15), (16), and (17), equations (18), (19), and (20) below are obtained:

$$\Delta e1=767.6237/f-11.2746 \qquad (18)$$

$$\Delta e2=1.0753\cdot f-73.2068 \qquad (19)$$

$$\delta 1F=1/(0.00140078\cdot RL-0.121537) \qquad (20)$$

In this manner, the changes in principal point interval upon a change in focal length can be obtained by the focal length detection unit, and the focusing shift amount can be obtained by the object distance detection unit.

When equations (15) and (16) are substituted in equations (12), (13), and (14), equations (21) and (22) below are obtained:

$$x=\{(1+\phi 1\cdot\delta 1F)\cdot f/(1-\phi 1\cdot f)\}\cdot\epsilon \qquad (21)$$

$$x=\{(1+0.037427\cdot\delta 1F)\cdot f/(1-0.037427\cdot f)\}\cdot\epsilon \qquad (22)$$

In this manner, the shift amount of the vibration compensation unit can be obtained by a calculation on the basis of the focusing shift amount calculated based on the signal from the object distance detection unit, the signal from the focal length detection unit, and the signal from the vibration detection unit.

When equation (20) is substituted in equation (22), equation (23) below is obtained:

$$x=[\{1/0.037427\cdot RL-3.247308)+1\}\cdot f/(1-0.037427\cdot f)]\cdot\epsilon \qquad (23)$$

In this manner, the shift amount of the vibration compensation unit can be obtained by a calculation on the basis of the signal from the object distance detection unit, the signal from the focal length detection unit, and the signal from the vibration detection unit.

Table 6 below shows the shift amount of the second lens group G2 as the anti-vibration lens group when the objective lens system according to the third embodiment of the present invention is inclined at the inclination angle $\epsilon$.

In Table 6, $\epsilon$ is the inclination angle of the lens, RL is the object distance, and x is the vibration compensation amount of the anti-vibration lens group.

TABLE 6

| | $\epsilon$ = 0.0025rad | $\epsilon$ = 0.0050rad | $\epsilon$ = 0.0075rad |
|---|---|---|---|
| f = 36.0696 | | | |
| RL = ∞ | x = −0.2577 | x = −0.5153 | x = −0.7730 |
| RL = 1400.0000 | x = −0.2629 | x = −0.5258 | x = −0.7887 |
| RL = 1000.0000 | x = −0.2652 | x = −0.5304 | x = −0.7956 |
| RL = 750.0000 | x = −0.2680 | x = −0.5361 | x = −0.8041 |
| f = 49.9990 | | | |
| RL = ∞ | x = −0.1435 | x = −0.2869 | x = −0.4304 |
| RL = 1400.0000 | x = −0.1464 | x = −0.2928 | x = −0.4391 |
| RL = 1000.0000 | x = −0.1477 | x = −0.2953 | x = −0.4430 |
| RL = 750.0000 | x = −0.1492 | x = −0.2985 | x = −0.4477 |
| f = 68.0808 | | | |
| RL = ∞ | x = −0.1099 | x = −0.2199 | x = −0.3298 |
| RL = 1400.0000 | x = −0.1122 | x = −0.2244 | x = −0.3365 |
| RL = 1000.0000 | x = −0.1132 | x = −0.2263 | x = −0.3395 |
| RL = 750.0000 | x = −0.1144 | x = −0.2287 | x = −0.3431 |

From Table 6, according to the third embodiment of the present invention, an optimal vibration compensation amount can be obtained in accordance with the focal length of the lens, the object distance, and the vibration amount of the objective lens system.

Fourth Embodiment

In the fourth embodiment, the present invention is applied to a two-group arrangement variable focal-length lens system in which the second lens group G2 performs an antivibration compensation, and also performs a focusing operation.

Table 7 below shows data of the fourth embodiment. Table 7 shows the i-th lens groups Gi (i=1, 2) in the order from the object side in the leftmost column, and also shows the refracting powers $\phi i$ of the lens groups, and the principal point intervals e0i in the reference state (f=68.0808, RL=∞). The principal point thickness ti in Table 7 represents the distance from the primary principal point Hi to the secondary principal point Hi' of the i-th lens group, RL represents the distance from the object point to the image plane, and f represents the focal length of the entire lens system when RL=∞.

In the fourth embodiment of the present invention, a change in principal point interval between the first and second lens groups G1 and G2 upon a change in focal length is represented by $\Delta e1$, a change in interval between the principal point of the second lens group G2 and the image plane is represented by $\Delta e2$, and the focusing shift amount of the second lens group G2 upon execution of a focusing operation is represented by $\delta 2F$.

TABLE 7

Data of Fourth Embodiment f = 68.0808 to 36.0696

| Group | Refracting Power | Principal Point Interval (f = 68.0808) | Principal Point Thickness |
|---|---|---|---|
| G1 | $\phi 1 = 0.037427$ | e01 = 9.2634 | t1 = 4.7063 |
| | | $\Delta e1 = 0$ | (f = 68.0808) |
| | | $\Delta e1 = 4.0776$ | (f = 49.9990) |
| | | $\Delta e1 = 10.0066$ | (f = 36.0696) |
| G2 | $\phi 2 = -0.034807$ | e02 = 44.4769 | t2 = 1.5985 |
| | | $\Delta e2 = 0$ | (f = 68.0808) |
| | | $\Delta e2 = -19.4433$ | (f = 49.9990) |
| | | $\Delta e2 = -34.4216$ | (f = 36.0696) |

Data associated with the focusing shift amount of the second lens group G2 upon execution of a focusing operation are as follows:

| | f = 68.0808 | f = 49.9990 | f = 36.0696 |
|---|---|---|---|
| RL = ∞ | $\delta 2F = 0$ | $\delta 2F = 0$ | $\delta 2F = 0$ |
| RL = 1400.0000 | $\delta 2F = -0.6436$ | $\delta 2F = -0.7564$ | $\delta 2F = -1.2316$ |
| RL = 1000.0000 | $\delta 2F = -0.9262$ | $\delta 2F = -1.0850$ | $\delta 2F = -1.7926$ |
| RL = 750.0000 | $\delta 2F = -1.2765$ | $\delta 2F = -1.4895$ | $\delta 2F = -2.5118$ |

The vibration compensation amount x with respect to the inclination angle $\epsilon$ is expressed as follows as in the second embodiment:

$$x = \{(e1+e2-e1 \cdot e2 \cdot \phi 2)/(e2 \cdot \phi 2)\} \cdot \epsilon \qquad (24)$$

for $$e1 = e01 + \Delta e1 - \delta 2F \qquad (25)$$

$$e2 = e02 + \Delta e2 + \delta 2F \qquad (26)$$

Note that the changes $\Delta e1$ and $\Delta e2$ in principal point interval upon a change in focal length are expressed as functions of the focal length f, and the focusing shift amount $\delta 2F$ of the second lens group G2 upon execution of the focusing operation is expressed as a function of the object distance RL and the focal length f.

In the fourth embodiment as well, the changes $\Delta e1$ and $\Delta e2$ in principal point interval upon a change in focal length are expressed as follows as in the third embodiment:

$$\Delta e1 = -1/(\phi 1 \cdot \phi 2 \cdot f) + 1/\phi 1 + 1/\phi 2 - e01 \qquad (27)$$

$$\Delta e2 = -(\phi 1/\phi 2) \cdot f + 1/\phi 2 - e02 \qquad (28)$$

$$\Delta e1 = 767.6237/f - 11.2746 \qquad (29)$$

$$\Delta e2 = 1.0753 \cdot f - 73.2068 \qquad (30)$$

The focusing shift amount $\delta 2F$ can be approximated by equation (31) below:

$$\delta 2F = f^2/\{(RL-e1-e2-t1-t2-1/\phi 1) \cdot (1-f^2 \cdot \phi 1^2)\} \qquad (31)$$

Furthermore, if it is assumed that $\Delta e1$, $\Delta e2$, and $\delta 2F$ are sufficiently smaller than the object distance RL, equation (31) can be approximated by:

$$\delta 2F = f^2/\{(RL-e01-e02-t1-t2-1/\phi 1) \cdot (1-f^2 \cdot \phi 1^2)\} \qquad (32)$$

When the constants of the fourth embodiment are substituted in equation (32), equation (33) below is obtained:

$$\delta 2F = f^2/\{(RL-86.7638) \cdot (1-0.00140078 \cdot f^2)\} \qquad (33)$$

In this manner, the changes in principal point interval upon a change in focal length can be obtained by the focal length detection unit, and the focusing shift amount can be obtained by the object distance detection unit and the focal length detection unit.

When equations (27) and (28) are substituted in equations (24), (25), and (26), equations (34) and (35) below are obtained:

$$x = [\{f - (\phi 1 \cdot f - 1/\phi 1/f + \phi 2/\phi 1) \cdot \delta 2F + \phi 2 \cdot \delta 2F^2\}/(\phi 2 \cdot \delta 2F - \phi 1 \cdot f + 1)] \cdot \epsilon \qquad (34)$$

$$x = [\{f - (0.037427 \cdot f - 26.718679/f - 0.929997) \cdot \delta 2F - 0.034807 \cdot \delta 2F^2\}/(1 - 0.034807 \cdot \delta 2F - 0.037427 \cdot f)] \cdot \epsilon \qquad (35)$$

In this manner, the shift amount of the vibration compensation unit can be obtained by a calculation on the basis of the focusing shift amount (calculated based on the signal from the object distance detection unit and the signal from the focal length detection unit), the signal from the focal length detection unit, and the signal from the vibration detection unit.

When equation (33) is substituted in equation (35), equation (36) below is obtained:

$$x = [\{f - (0.037427 \cdot f - 26.718679/f - 0.929997) \cdot f^2/(RL - 86.7638)/(1 - 0.00140078 \cdot f^2) - 0.034807 \cdot f^4/(RL - 86.7638)^2/(1 - 0.00140078 \cdot f^2)^2\}/\{1 - 0.034807 \cdot f^2/(RL - 86.7638)/(1 - 0.00140078 \cdot f^2) - 0.037427 \cdot f\}] \cdot \epsilon \qquad (36)$$

In this manner, the shift amount of the vibration compensation unit can be obtained by a calculation on the basis of the signal from the object distance detection unit, the signal from the focal length detection unit, and the signal from the vibration detection unit.

Table 8 below shows the shift amount of the second lens group G2 as the anti-vibration lens group when the lens system of the fourth embodiment is inclined at the inclination angle $\epsilon$. In Table 8, $\epsilon$ is the inclination angle of the lens, RL is the object distance, and x is the vibration compensation amount of the anti-vibration lens group.

TABLE 8

| | $\epsilon =$ 0.0025rad | $\epsilon =$ 0.0050rad | $\epsilon =$ 0.0075rad |
|---|---|---|---|
| f = 36.0696 | | | |
| RL = ∞ | x = −0.2577 | x = −0.5153 | x = −0.7730 |
| RL = 1400.0000 | x = −0.2892 | x = −0.5784 | x = −0.8675 |
| RL = 1000.0000 | x = −0.3056 | x = −0.6112 | x = −0.9168 |
| RL = 750.0000 | x = −0.3288 | x = −0.6575 | x = −0.9863 |
| f = 49.9990 | | | |
| RL = ∞ | x = −0.1435 | x = −0.2869 | x = −0.4304 |
| RL = 1400.0000 | x = −0.1488 | x = −0.2976 | x = −0.4464 |
| RL = 1000.0000 | x = −0.1512 | x = −0.3025 | x = −0.4537 |
| RL = 750.0000 | x = −0.1543 | x = −0.3086 | x = −0.4628 |
| f = 68.0808 | | | |
| RL = ∞ | x = −0.1099 | x = −0.2199 | x = −0.3298 |
| RL = 1400.0000 | x = −0.1128 | x = −0.2256 | x = −0.3385 |
| RL = 1000.0000 | x = −0.1141 | x = −0.2282 | x = −0.3423 |
| RL = 750.0000 | x = −0.1157 | x = −0.2314 | x = −0.3470 |

From Table 8, according to the fourth embodiment of the present invention, an optimal vibration compensation amount can be obtained in accordance with the focal length of the objective lens system, the object distance, and the vibration amount of the objective lens system.

As described above, according to the first to fourth embodiments of the present invention, even when the state of the objective lens system changes upon a zooming or focusing operation, an optimal vibration compensation amount can be obtained according to the change in state.

The present invention can be applied not only to an objective lens system whose state is changed by a zooming or focusing operation, but also to many optical systems which change the states of objective lens systems, such as lenses for changing various aberrations, e.g., a variable soft focus lens for changing the spherical aberration, a variable image plane characteristic lens for changing the curvature of field, and the like.

As described above, according to the present invention, an anti-vibration optical device which, even when the state of the objective lens system changes upon a zooming or focusing operation, can calculate an optimal vibration compensation amount according to the change in state, and can satisfactorily compensate for a vibration by driving the vibration compensation unit, can be realized.

What is claimed is:

1. An anti-vibration optical device, comprising:

an objective lens system including, in an order from an object side, a first lens group, a second lens group, and a third lens group, said second lens group being shiftable in an optical axis direction of said objective lens system for focusing;

said third lens group being shiftable in a direction substantially perpendicular to the optical axis of said objective lens system;

a vibration detection unit for detecting a vibration of said objective lens system, and outputting a vibration signal indicative of the vibration of said objective lens system;

a vibration compensation unit for moving said third lens group by a vibration shift amount;

a shift amount detection unit for detecting a focusing shift amount of said second lens group required to perform said focusing, and outputting a focusing shift amount signal indicative of the focus shift amount; and a calculation unit for calculating the vibration shift amount of said vibration compensation unit on the basis of the focusing shift amount signal from said shift amount detection unit and the vibration signal from said vibration detection unit.

2. The device according to claim 1, wherein said calculation unit calculates said vibration shift amount according to the following equation, $$\chi = (A_1 \cdot \delta_2^2 + A_2 \cdot \delta_2 + A_3) \cdot \epsilon$$

where $\chi$ is the vibration shift amount of said third lens group, $\delta_2$ is the focusing shift amount of said second lens group, $A_1$, $A_2$, and $A_3$ are constants, and $\epsilon$ is an inclination angle of said objective lens system.

3. An anti-vibration optical device comprising:

an objective lens system including, in an order from an object side, a first lens group, a second lens group, and a third lens group, said second lens group being shiftable in an optical axis direction of said objective lens system for focusing, said third lens group being shiftable in a direction substantially perpendicular to the optical axis of said objective lens system;

a vibration detection unit for detecting a vibration of said objective lens system, and outputting a vibration signal indicative of the vibration of said objective lens system;

a vibration compensation unit for moving said third lens group by a vibration shift amount;

an object distance detection unit for detecting an object distance, and outputting an object distance signal indicative of the object distance;

a first calculation unit for calculating a focusing shift amount of said second lens group on the basis of the object distance signal from said object distance detection unit;

a focusing unit for performing a focusing operation by shifting said second lens group of said objective lens system on the basis of the calculated focusing shift amount; and a second calculation unit for calculating the vibration shift amount of said vibration compensation unit on the basis of the object distance signal from said object distance detection unit and the vibration signal from said vibration detection unit.

4. The device according to claim 3, wherein said second calculation unit calculates said vibration shift amount according to the following equation, $$\chi = \{A_1/(B_1 \cdot RL + B_2)^2 - A_2/(B_1 \cdot R1 + B_2) + A_3\} \cdot \epsilon$$

where $\chi$ is the vibration shift amount of said third lens group, RL is the object distance, $A_1$, $A_2$, $A_3$, $B_1$, and $B_2$ are constants, and $\epsilon$ is an inclination angle of said objective lens system.

5. The anti-vibration optical device according to claim 4, wherein said first calculation unit and said second calculation unit are formed in a single computing unit.

6. An anti-vibration optical device comprising:

an objective lens system which is a variable focal-length lens group, including, in an order from an object side, a first lens group, and a second lens group, said first lens group being shiftable in an optical axis direction of said objective lens system for focusing and zooming, said second lens group being shiftable in the optical axis direction of said objective lens system for zooming, and said second lens group being shiftable in a direction substantially perpendicular to the optical axis of said objective lens system for vibration compensation;

a vibration detection unit for detecting a vibration of said objective lens system, and outputting a vibration signal indicative of the vibration of said objective lens system;

a vibration compensation unit for moving said second lens group by a vibration shift amount in the direction substantially perpendicular to the optical axis of said objective lens system;

a first shift amount detection unit for detecting a first shift amount of said first lens group for focusing and zooming, and outputting a first shift amount signal indicative of the first shift amount of said first lens group;

a second shift amount detection unit for detecting a second shift amount, in the optical axis direction, of said second lens group for zooming, and outputting a second shift amount signal indicative of the second shift amount, in the optical axis direction, of said second lens group; and a calculation unit for calculating the vibration shift amount for said vibration compensation unit on the basis of the first shift amount signal from said first shift amount detection unit, the second shift amount signal from said second shift amount detection unit, and the vibration signal from said vibration detection unit.

7. The device according to claim 6, wherein said calculation unit calculates said vibration shift amount according to the following equation, $$\chi = \{(C_1 \cdot \delta_1 \cdot \delta_2 + C_2 \cdot \delta_2^2 + C_3 \cdot \delta_1 + C_4 \cdot \delta_2 + C_5)/(C_6 \cdot \delta_2 + C_7)\} \cdot \epsilon$$

where $\chi$ is the vibration shift amount of said second lens group in the direction substantially perpendicular to the optical axis, $\delta_1$ is the first shift amount of said first lens group for focusing and zooming, $\delta_2$ is the second shift amount of said second lens group for zooming in the optical axis direction, $\epsilon$ is an inclination angle of said objective lens system, and $C_1$, $C_2$, $C_3$, $C_4$, $C_5$, $C_6$ and $C_7$ are constants.

8. An anti-vibration optical system comprising:

an objective lens system including, in an order from an object side, a first lens group, and a second lens group, said objective lens system changing a focal length of the optical system by changing an air gap between said first lens group and said second lens group, and focusing by shifting said first lens group in an optical axis direction of said objective lens system;

a vibration detection unit for detecting a vibration of said objective lens system, and outputting a vibration signal indicative of the vibration of said objective lens system;

a vibration compensation unit for moving said second lens group in a direction substantially perpendicular to the optical axis of said objective lens system;

a focal length detection unit for detecting a set focal length of said objective lens system, and outputting a focal length signal indicative of the focal length;

a focusing shift amount detection unit for detecting a focusing shift amount of said first lens group, and outputting a focusing shift amount signal indicative of the focusing shift amount; and a calculation unit for calculating a vibration shift amount for said vibration compensation unit on the basis of the focal length signal from said focal length detection unit, the focusing shift amount signal from said focusing shift amount detection unit, and the vibration signal from said vibration detection unit.

9. The anti-vibration optical system according to claim 8, where said calculation unit calculates said vibration shift amount according to the following equation, $$\chi = \{(1 + A_1 \cdot \delta_{1F}) \cdot f/(1 - A_1 \cdot f)\} \cdot \epsilon$$

where $\chi$ is the vibration shift amount of said second lens group in a direction substantially perpendicular to the optical axis, $\delta_{1F}$ is the focusing shift amount of said first lens group for focusing, f is the focal length of said objective lens system, $\epsilon$ is an inclination angle of said objective lens system, and $A_1$ is a constant.

10. The anti-vibration optical system according to claim 9, wherein said constant value $A_1$ is a refractive power of said first lens group.

11. An anti-vibration optical system comprising:

an objective lens system including, in an order from an object side, a first lens group, and a second lens group, said objective lens system changing a focal length of the optical system by changing an air gap between said first lens group and said second lens group, and focusing by shifting said first lens group in an optical axis direction of said objective lens system;

a vibration detection unit for detecting a vibration of said objective lens system, and outputting a vibration signal indicative of the vibration of said objective lens system;

a vibration compensation unit for moving said second lens group by a vibration shift amount in a direction substantially perpendicular to the optical axis of said objective lens system;

a focal length detection unit for detecting a set focal length of said objective lens system, and outputting a focal length signal indicative of the focal length;

an object distance detection unit for detecting an object distance, and outputting an object distance signal indicative of the object distance;

a first calculating unit for calculating a focusing shift amount of said first lens group on the basis of the object distance signal from said object distance detection unit;

a focusing unit for performing a focusing operation by shifting said first lens group on the basis of the calculated focusing shift amount; and a second calculation unit for calculating the vibration shift amount of said vibration compensation unit on the basis of the focal length signal from said focal length detecting unit, the object distance signal from said object distance detection unit, and the vibration signal from said vibration detection unit.

12. The anti-vibration optical system according to claim 11, wherein said second calculation unit calculates said vibration shift amount according to the following equation, $$\chi = [\{1/(A_1 \cdot RL + A_2) + 1\} \cdot f/(1 + A_3 \cdot f)] \epsilon$$

where $\chi$ is the vibration shift amount of said second lens group for vibration compensation, RL is the object distance, f is the focal length of said objective lens system, $\epsilon$ is an inclination angle of said objective lens system, and $A_1$ $A_2$ and $A_3$ are constants.

13. The anti-vibration optical system according to claim 12, wherein said first calculation means and said second calculation means are formed in a single computing unit.

14. An anti-vibration optical system comprising:

an objective lens system including, in an order from an object side, a first lens group, and a second lens group, said objective lens system changing a focal length by changing an air gap between said first lens group and said second lens group, and focusing by shifting said second lens group in an optical axis direction of said objective lens system;

a vibration detection unit for detecting a vibration of said objective lens system, and outputting a vibration signal indicative of the vibration of said objective lens system;

a vibration compensation unit for moving said second lens group by a vibration shift amount in a direction substantially perpendicular to the optical axis of said objective lens system;

a focal length detection unit for detecting a set focal length of said objective lens system, and outputting a focal length signal indicative of the focal length;

a focusing shift amount detection unit for detecting a focusing shift amount of said second lens group in the optical axis direction, and outputting a focusing shift amount signal indicative of the focusing shift amount;

calculation unit for calculating the vibration shift amount of said vibration compensation unit on the basis of the focal length signal from said focal length detection unit, the focusing shift amount signal from said focusing shift amount detection unit, and the vibration signal from said vibration detection unit.

15. The anti-vibration optical system according to claim 14, wherein said calculation unit calculates said vibration shift amount, according to the following equation, $$\chi = [\{f + (A_1 \cdot f + A_2/f + A_3) \cdot \delta_{2F} + A_4 \cdot \delta_{2F}^2 \}/(1 + A_5 \cdot \delta_{2F} + A_6 \cdot f)] \cdot \epsilon$$

where $\chi$ is the vibration shift amount of said second lens group in the direction substantially perpendicular to the optical axis, $\delta_{2F}$ is the focusing shift amount of said second lens group in the optical axis direction for focusing, f is the focal length of said objective lens system, $\epsilon$ is an inclination angle of said objective lens system, and $A_1$, $A_2$, $A_3$, $A_4$, $A_5$ and $A_6$ are constants.

16. An anti-vibration optical system comprising:

an objective lens system including in an order from an object side, a first lens group, and a second lens group, said objective lens system changing the focal length by changing an air gap between said first lens group and said second lens group, and focusing by shifting said second lens group in an optical axis direction of said objective lens system;

a vibration detection unit for detecting a vibration of said objective lens system, and outputting a vibration signal indicative of the vibration of said objective lens system;

a vibration compensation unit for moving said second lens group by a vibration shift amount in a direction substantially perpendicular to the optical axis of said objective lens system;

a focal length detection unit for detecting a set focal length of said objective lens system, and outputting a focal length signal indicative of the focal length;

an object distance detection unit for detecting an object distance, and outputting an object distance signal indicative of the object distance;

a first calculating unit for calculating a focusing shift amount of said second lens group on the basis of the object distance signal from said object distance detection unit and the focal length signal from said focal length detection unit;

a focusing unit for performing a focusing operation by shifting said first lens group on the basis of the calculated focusing shift amount; and a second calculation unit for calculating the vibration shift amount of said vibration compensation unit on the basis of the focal length signal from said focal length detecting unit, the object distance signal from said object distance detection unit, and the vibration signal from said vibration detection unit.

17. The anti-vibration optical system according to claim 16, wherein said second calculation unit calculates said vibration shift amount according to the following equation, $$\chi = \left[ \left\{ f + \frac{(A_1 \cdot f + A_2/f + A_3) \cdot f^2}{(RL + A_4) \cdot (1 + A_5 \cdot f^2)} + \frac{A_6 \cdot f_4}{(RL + A_4)^2 \cdot (1 + A_5 \cdot f^2)^2} \right\} / \left\{ 1 + \frac{A_1 \cdot f^2}{(RL + A_4) \cdot (1 + A_5 \cdot f^2)} + A_8 \cdot f \right\} \right] \cdot \epsilon$$

where $\chi$ is the vibration shift amount of said second lens group for vibration compensation, RL is the object distance, f is the focal length of said objective lens system, $\epsilon$ is an inclination angle of said objective lens system, and $A_1$, $A_2$, $A_3$, $A_4$, $A_5$, $A_6$, $A_7$, and $A_8$ are constants.

18. An anti-vibration optical system according to claim 17, wherein said first calculation unit and said second calculation unit are formed in a single computing unit.

* * * * *